US008482783B2

(12) United States Patent
Fujita et al.

(10) Patent No.: US 8,482,783 B2
(45) Date of Patent: *Jul. 9, 2013

(54) NETWORK SCANNING SYSTEM

(71) Applicant: Canon Denshi Kabushiki Kaisha, Saitama (JP)

(72) Inventors: Daisuke Fujita, Saitama (JP); Hirokazu Higuchi, Saitama (JP); Minoru Okawara, Saitama (JP); Nozomi Masao, Saitama (JP); Hiroshi Komuro, Saitama (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,100

(22) Filed: Oct. 24, 2012

(65) Prior Publication Data

US 2013/0088760 A1  Apr. 11, 2013

Related U.S. Application Data

(63) Continuation of application No. 12/983,431, filed on Jan. 3, 2011, now Pat. No. 8,320,007, which is a continuation of application No. 10/714,953, filed on Nov. 18, 2003, now abandoned.

(30) Foreign Application Priority Data

Nov. 19, 2002  (JP) ................................. 2002-335711
Nov. 19, 2002  (JP) ................................. 2002-335712

(51) Int. Cl.
*H04N 1/00* (2006.01)
*G06F 13/00* (2006.01)

(52) U.S. Cl.
USPC ......... 358/1.15; 358/1.13; 358/501; 358/505; 358/403; 709/203; 709/201

(58) Field of Classification Search
USPC ........ 358/1.15, 1.13, 501, 505, 403; 709/203, 709/201
See application file for complete search history.

(56) References Cited

U.S. PATENT DOCUMENTS 5,371,574 A   12/1994  Ohmura et al.
5,699,494 A   12/1997  Colbert et al.
(Continued)

FOREIGN PATENT DOCUMENTS

EP   1011259   6/2000
EP   1030507   8/2000
(Continued)

*Primary Examiner* — King Poon
*Assistant Examiner* — Lawrence Wills
(74) *Attorney, Agent, or Firm* — Fitzpatrick, Cella, Harper & Scinto

(57) ABSTRACT

A network scanning system has a control apparatus connected to a connection device via a network and includes a scanning application for remotely controlling a scanner, where the scanning application receives a command from the connection device and automatically transmits to a display unit of the connection device via the network without a user operation of the scanning application, a selection screen information, the connection device displays a selection menu and transmits, to the scanning application in the control apparatus, a selection item information specifying an item selected by a user of the display unit, and the scanning application automatically transmits, to the connection device without a user operation of the scanning application in the control apparatus, a control signal based on the selection item, and the scanning application in the control apparatus automatically controls the scanner remotely in accordance with the control signal via the network.

8 Claims, 45 Drawing Sheets

U.S. PATENT DOCUMENTS

| | | | |
|---|---|---|---|
| 5,815,280 | A | 9/1998 | Ohmura et al. |
| 5,911,044 | A | 6/1999 | Lo |
| 6,134,595 | A | 10/2000 | Huang et al. |
| 6,246,485 | B1 | 6/2001 | Brown et al. |
| 6,256,662 | B1 | 7/2001 | Lo |
| 6,825,942 | B1 | 11/2004 | Kamiyama et al. |
| 7,019,858 | B1 | 3/2006 | Gopalasamy |
| 7,076,550 | B1 * | 7/2006 | Noguchi et al. ............ 709/225 |
| 7,139,094 | B2 | 11/2006 | Blasio et al. |
| 7,293,114 | B2 | 11/2007 | Yashiki |
| 8,320,007 | B2 * | 11/2012 | Fujita et al. ................ 358/1.15 |
| 2002/0012046 | A1 | 1/2002 | Ishino |
| 2002/0059361 | A1 | 5/2002 | Saruwatari |
| 2002/0118386 | A1 | 8/2002 | Sakai |
| 2002/0156923 | A1 | 10/2002 | Tanimoto |
| 2004/0128412 | A1 | 7/2004 | Harrison |

FOREIGN PATENT DOCUMENTS

| | | |
|---|---|---|
| JP | 5-122424 | 5/1993 |
| JP | 8-329005 | 12/1996 |
| JP | 9-36999 | 2/1997 |
| JP | 10-164093 | 6/1998 |
| JP | 11-120111 | 4/1999 |
| JP | 2000-59561 | 2/2000 |
| JP | 2000-174964 | 6/2000 |
| JP | 2001-285560 | 10/2001 |
| JP | 2001-345983 | 12/2001 |
| JP | 2001-357392 | 12/2001 |
| JP | 2002-158827 | 5/2002 |
| JP | 2002-281195 | 9/2002 |
| JP | 2002-290647 | 10/2002 |
| JP | 2003-274096 | 9/2003 |

* cited by examiner

F I G. 10
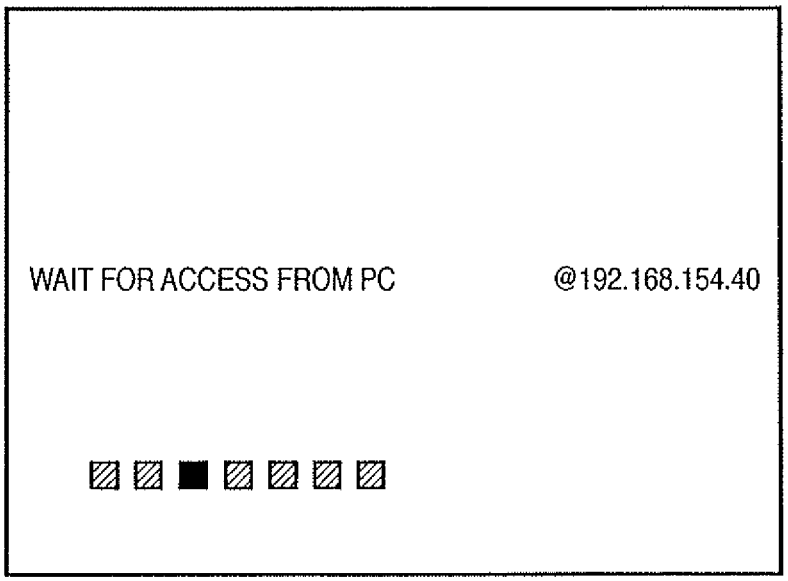

F I G. 14
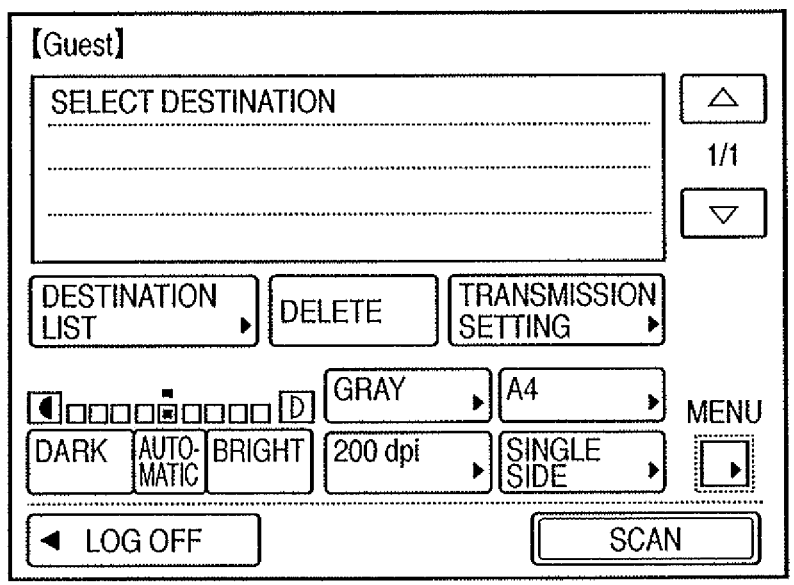

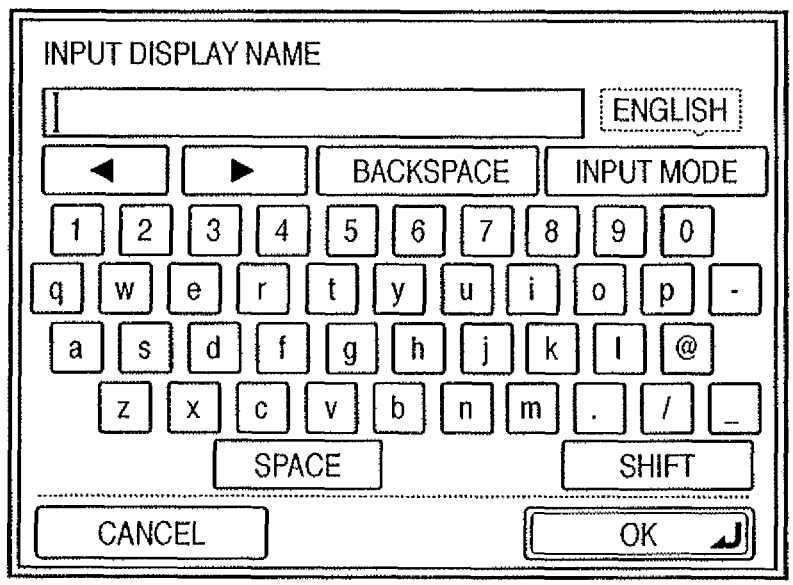
F I G. 23

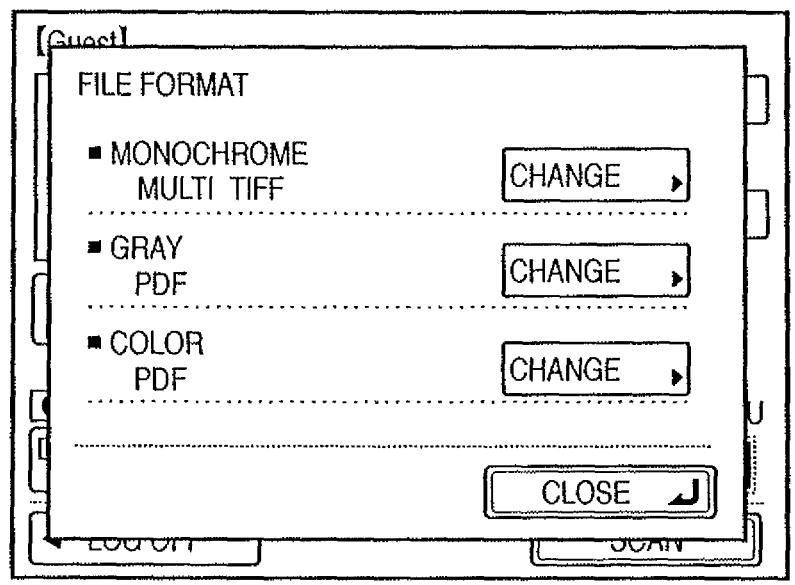
F I G. 36

F I G. 41
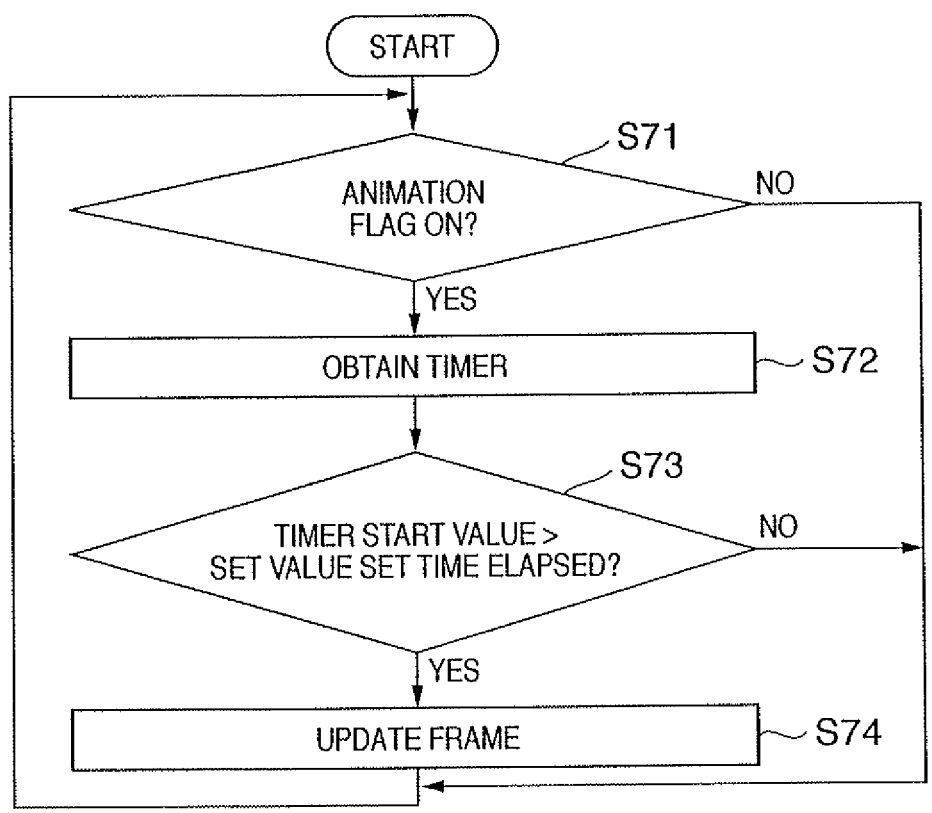

NETWORK SCANNING SYSTEM

This application is a continuation of application Ser. No. 12/983,431, filed on Jan. 3, 2011 (pending), which is a continuation of application Ser. No. 10/714,953, filed on Nov. 18, 2003 (abandoned).

FIELD OF THE INVENTION

The present invention relates to a technique of connecting an image scanner device to a network.

BACKGROUND OF THE INVENTION

Generally, an image scanner device is connected to a general information processing apparatus such as a personal computer or a work station (hereinbelow, generally referred to as a "PC") via a SCSI (Small Computer System Interface) or a USB (Universal Serial Bus) interface.

As applications of the image scanner device, optical character recognition (OCR), filing and other various applications are known. In recent years, the variety of uses for the image scanner device such as generation of attachment to an electronic mail is further increased.

On the other hand, in workplaces, employees respectively use one PC, and the PCs are connected to a network to share network resources (files, printers etc.). As it is desirable that the image scanner device can also be shared on the network, several network-connectable scanner devices (generally many of them have a complex machine form) are known, however, such devices are very expensive.

As a response to the requirement, Japanese Published Unexamined Patent Application No. 2001-285560 discloses a device for connection between an image scanner device having a SCSI interface to a network, a scan box, provided between the scanner device and the network. The scan box communicates with an application which operates on a particular PC on the network. Then the content of operation on the scan box side (e.g., notification of depression of start button) is notified to the PC, then job information specific to an operator is received from the PC. Then, a read image is transferred to a file server and stored there in accordance with the received job information.

According to the technique disclosed in the above patent document, the existing image scanner device can be connected to the network via the scan box, however, as the scan box is controlled by the particular application which operates on the PC, the scanner connected to the scan box can be utilized by the particular application but cannot be utilized by a general application such as a graphic application.

Further, this technique of enabling connection between an existing image scanner to a network via the scan box has the following problems.

The scan box is desirably provided with various switches, for example, such as a start button and a scroll button. Therefore, a CPU in the scan box must perform processing in correspondence to each button operation. That is, the processing by the CPU cannot be simplified. Further, in accordance with scanner type, the firmware stored in an internal ROM of the scanner must be updated.

SUMMARY OF THE INVENTION

The present invention has been made to solve the above problems, and provides a technique for enabling use of image scanner device, which is connected to a general information processing apparatus, on a network at a low cost, and further, for improvement of user's convenience by realizing maintenance-free firmware in hardware for use of the scanner device on the network.

Further, the present invention provides a technique for enabling use of image scanner device, which is connected to a general information processing apparatus, on a network at a low cost, and further, for enabling use of remote scanner without any substantial change in an existing application to use the image scanner.

According to the present invention, the foregoing objects are attained by providing a network scanning system having: a connection apparatus including a scanner interface and a network interface, which are connected to a scanner device connected to a general information processing apparatus, so as to cause the scanner device to function as a network scanner device; and a control apparatus to control the connection apparatus via a network, wherein the connection apparatus comprising: standard input/output means for receiving bitmap image data generated by drawing processing in the control apparatus via the network interface then displaying the bitmap image data on a predetermined display unit, and outputting an input into a predetermined instruction input unit from a user to the control apparatus via the network interface; and scanner communication means for receiving an instruction command to the scanner device issued by the control apparatus via the network interface then outputting the command to the scanner interface, and transmitting data received via the scanner interface to the control apparatus via the network interface, and wherein the control apparatus comprising: virtual standard input/output means for transmitting bitmap image data drawn in accordance with a request from a scanner control application to the standard input/output means of the connection apparatus, and notifying the application of an input from the standard input/output means, thereby causing the standard input/output means of the connection apparatus to function as a virtual standard input/output device of the control apparatus; and virtual scanner communication means for transmitting a request command from a scanner driver for the scanner device to the scanner communication means of the connection apparatus, and outputting information from the scanner communication means to the scanner driver, thereby causing the scanner device connected to the connection apparatus to function as a scanner device virtually connected to the control apparatus.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is an example of initial screen image displayed on an LCD of the scanner/network connection apparatus according to the first embodiment;

FIGS. 12 to 38 are examples of screen images on the scanner/network connection apparatus according to the first embodiment;

FIG. 41 is a flowchart showing a processing procedure by an animation task according to the second embodiment;

DETAILED DESCRIPTION OF THE PREFERRED EMBODIMENTS

Preferred embodiments of the present invention will now be described in detail in accordance with the accompanying drawings.

[First Embodiment]

<Entire System>

Figure 1:
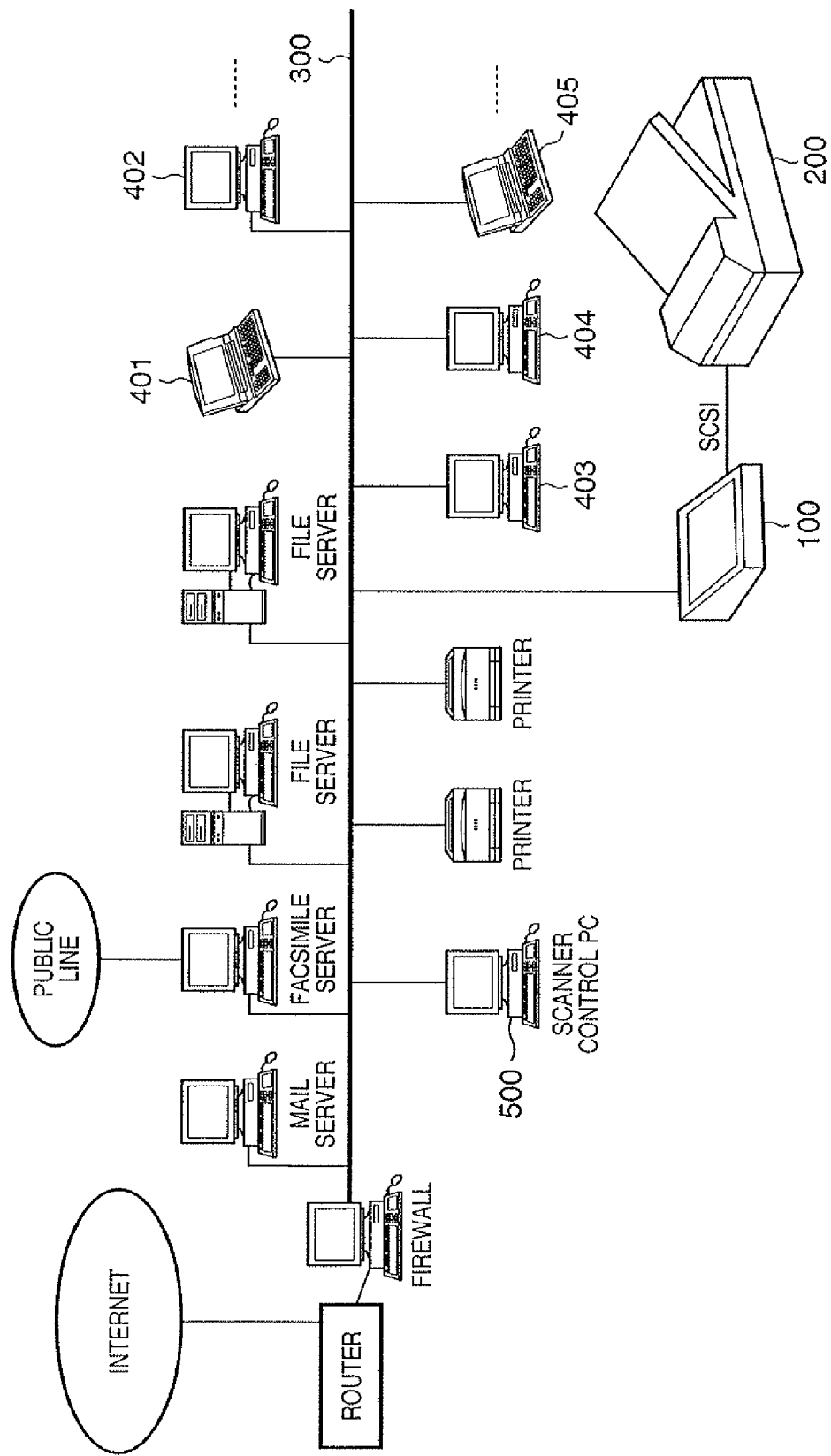
FIG. 1 a conceptual diagram of a computer network to which a first embodiment of the present invention is applied.

FIG. 1 illustrates the form of a system utilizing a scanner/network connection apparatus according to a first embodiment of the present invention.

In FIG. 1, reference numeral 100 denotes a scanner/network connection apparatus having a network interface and a SCSI interface; 200, an image scanner device (hereinbelow, simply referred to as a "scanner" having a SCSI interface; 300, a local area network (hereinbelow, simply referred to as a "network") such as an Ethernet; 401 to 405, personal computers (PCs) connected to the network 300 used by respective users; and 500, a control PC which manages and remote-controls the scanner/network connection apparatus 100. Note that there is no hardware difference between the control PC 500 and the PCs 401 to 405, but the difference is whether or not an application to control the scanner/network connection apparatus and various driver programs to be described later operate. Further, as it will be apparent from a description to be made later, the control PC 500 is used by an administrator, and the existence of the control PC 500 is not necessarily known by the users of the PCs 401 to 405. Note that in FIG. 1, as the PCs for general users, the 5 PCs 401 to 405 are shown, but the present invention is not limited to this number. Further, in FIG. 1, various servers, a router, printers provided on the network are shown, however, as these devices are well known, explanations of the devices will be omitted. Note that in the present embodiment, as a protocol for the network 300, TCP/IP is utilized. However, any other protocol may be used as long as it can realize the following functions.

<Scanner Control PC and Scanner/Network Connection Apparatus>

Figure 2:
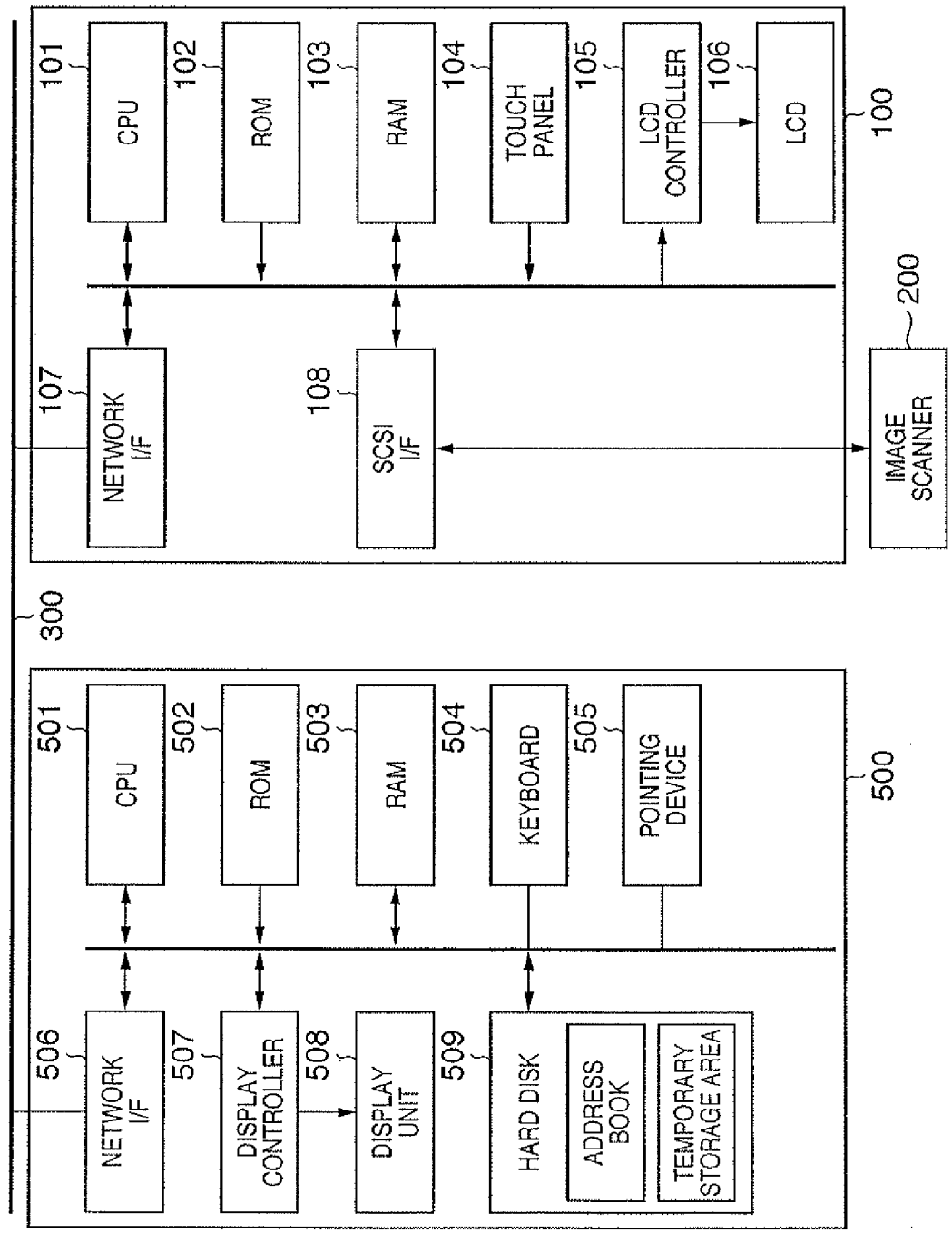
FIG. 2 is a block diagram showing the constructions of a scanner/network connection apparatus and a scanner control PC according to the first embodiment.

FIG. 2 is a block diagram showing the constructions of the scanner/network connection apparatus 100, the scanner 200, the network 300 and the scanner control PC 500.

The hardware construction of the scanner control PC 500 which is not so different from that of a general PC, will be described.

In FIG. 2, numeral 501 denotes a CPU which controls the entire apparatus; 502, a ROM in which a boot program, a BIOS and the like are stored; 503, a RAM in which an OS or an application executed by the CPU 501 is loaded, or which is used as a work area; 504, a keyboard; 505, a pointing device such as a mouse (trademark); 506, a network interface for connection with the network 300; 507, a display controller having a graphic engine processor and a video memory; 508, a display unit such as a CRT; and 509, a hard disk unit in which the OS, a scanning application according to the embodiment, and further, an image, are temporarily stored. Note that any OS may be employed, but in this embodiment, Windows (R) provided by Microsoft Corporation is used. The details of the scanning application will be described later.

On the other hand, the scanner/network connection apparatus 100 has the following construction. Numeral 101 denotes a CPU which controls the entire apparatus (in this CPU, a high-speed capability as in the case of a general PC is not required); 102, a ROM in which a program as a processing procedure (firmware) is stored; 103, a RAM used as a work area; 104, a touch panel; 105, a liquid crystal display controller; and 106, a liquid crystal display unit. In the present embodiment, the touch panel is a pressure-sensitive type panel having a transparent sheet, and is provided in front of the liquid crystal display (LCD) unit 106. Note that the coordinate detection system is not limited to this type of touch panel, but any other system can be used. Further, the LCD 106 of the present embodiment has a 320×200 dot display capability as a sufficient resolution to function as a user interface of the scanner 200, and the LCD handles a binary display image. Numeral 107 denotes a network interface; and 108, a SCSI interface. As the image scanner 200 is an existing scanner device having a SCSI interface, the details of the scanner will be omitted.

Figure 3:
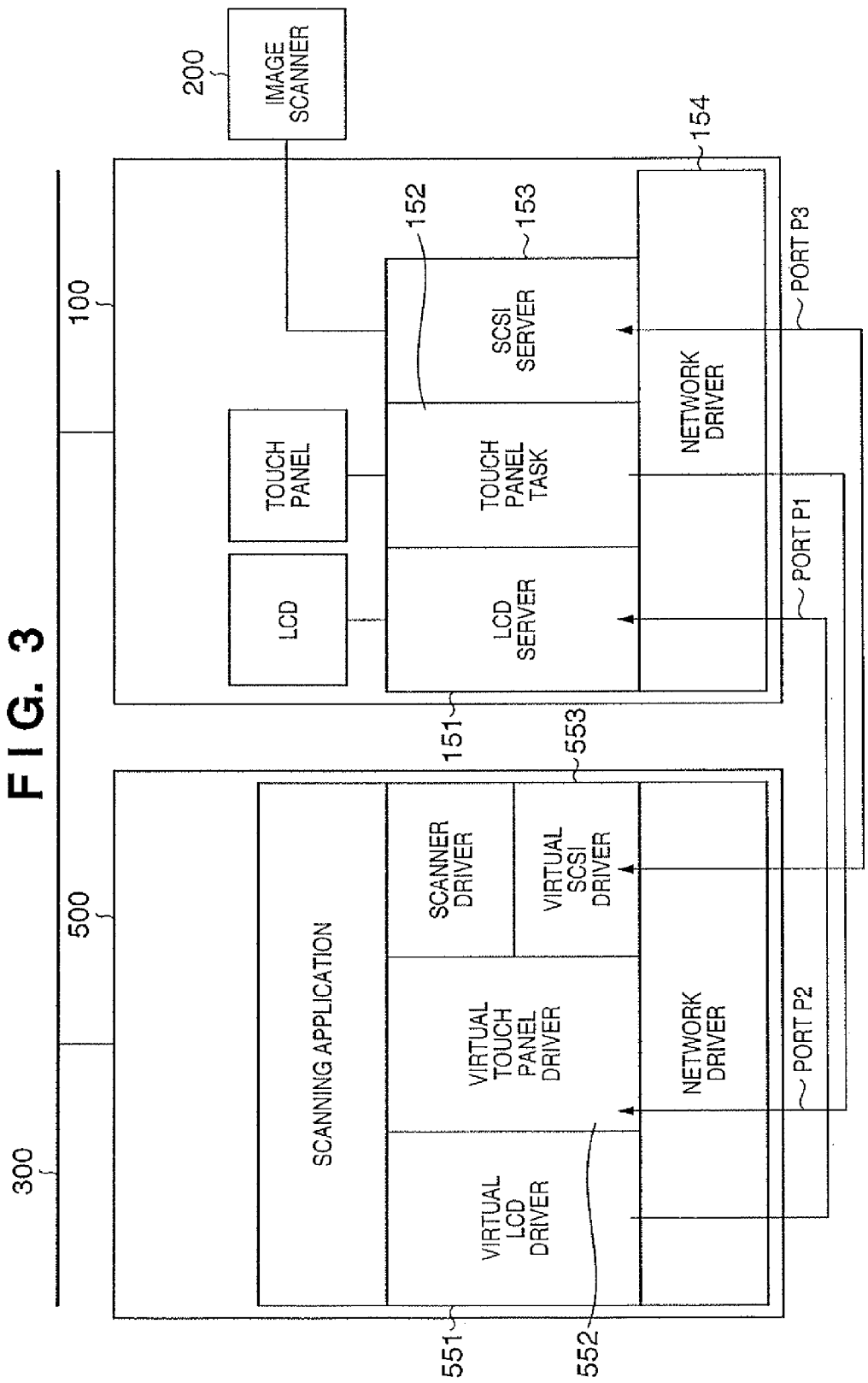
FIG. 3 is a block diagram showing layer structures of the scanner/network connection apparatus and a computer program for the scanner control PC according to the first embodiment.

FIG. 3 shows layer structures of the scanner control PC 500 and the scanner/network connection apparatus 100 in FIG. 2 from the point of software.

A network driver and a scanner driver operate on the scanner control PC 500. The network driver is provided by a maker/seller of the network interface 506 or is a driver supported by the OS. Further, the scanner driver is provided by a maker of the scanner 200 such as a TWAIN driver. The feature of the present embodiment resides in a virtual LCD driver 551, a virtual touch panel driver 552 and a virtual SCSI driver 553.

The virtual LCD driver 551 operates as if the LCD 106 and the LCD controller 105 of the remote scanner/network connection apparatus 100 are connected as hardware to the local scanner control PC 500. Also, the virtual touch panel driver 552 operates as if the touch panel 104 of the scanner/network connection apparatus 100 is connected as hardware to the local scanner control PC 500. Further, the virtual SCSI driver 553 operates as if the SCSI interface 108 of the scanner/network connection apparatus 100 is connected as hardware to the local scanner control PC 500.

That is, the three virtual drivers cause the hardware resources of the remote scanner/network connection apparatus 100 to operate as if they operate on the local scanner control PC 500. More specifically, by the virtual LCD driver 551 and the virtual touch panel driver 552, a standard input/output device (in the field of computer technology, also referred to as a "console" which collectively means a display device and an input device to receive an input from a user) operates as if it is connected to the scanner control PC 500, and by the virtual SCSI driver, the SCSI interface (card) operates as if it is connected to the scanner control PC 500.

On the other hand, a network driver 154 as firmware operates on the scanner/network connection apparatus 100, and an LCD server 151, a touch panel task 152 and a SCSI server 153 operate in a higher layer.

In the above construction, the virtual LCD driver 551 in the scanner control PC 500 and the LCD server 151 in the scanner/network connection apparatus 100 in cooperation realize image display on the LCD 151 of the scanner/network connection apparatus 100. Accordingly, as the format of data outputted from the virtual LCD driver 551 of the scanner control PC 500 to the scanner/network connection apparatus 100, an identification code, display coordinate position (x, y) at the upper-left corner of a rectangular image to be displayed, a width W and a height H as the rectangle size, and an actual bit stream (1 pixel-1 bit binary image data) are used.

Further, the virtual touch panel driver 552 in the scanner control PC 500 and the touch panel task 152 in the scanner/network connection apparatus 100 in cooperation detect a touch coordinate position (x, y) by the user on the touch panel 104 of the scanner/network connection apparatus 100 and notify the position to the higher layer. As the data flows from the touch panel task 152 to the touch panel driver 552,. the touch panel task 152 works as a client, and the touch panel driver 552, as a server.

Then, the virtual SCSI driver 553 in the scanner control PC 500 and the SCSI server 153 in the scanner/network connection apparatus 100 work in cooperation. That is, when a request command is received from the scanner driver of the scanner control PC, the virtual SCSI server 553 transmits the request command to the scanner/network connection apparatus 100. The scanner/network connection apparatus 100 receives the command, then outputs the command via the SCSI server 153 to the scanner 200. Further, data outputted from the scanner 200 (including read image data) can be supplied, in a reverse way, to an application which operates on the scanner control PC.

In this manner, briefly 3 types of data are handled between the scanner control PC 500 and the scanner/network connection apparatus 100. Accordingly, is it necessary to discriminate the respective types of data. In the present embodiment, the problem is solved by using a port number indicating a logic. That is, a transmission destination IP address and a sender IP address are added to a header of a packet to be transmitted onto the network, and further, regarding data on display, a port number P1, or regarding touch panel coordinate data, a port number P2, or data on SCSI, a port number P3, is added to the header. The allocation of port number is performed by the respective network drivers. Note that generally, in TCP/IP communication, the client side designates a port number to access the server. In other words, the client side must use a port number opened on the server side.

As shown in FIG. 3, the scanner/network connection apparatus 100 has specialized hardware, and the LCD server 151 and the SCSI server 153 operating there functions as servers. Accordingly, the ports P1 and P3 can be fixedly used by these two servers. That is, the virtual LCD driver and the virtual SCSI driver of the scanner control PC 500 can perform communication on the presumption that the ports P1 and P3 of the IP address of the scanner/network connection apparatus 100 are open.

On the other hand, in communication of touch panel coordinate position information, the virtual touch panel driver 552 which operates on the scanner control PC 500 side is the receiving side, i.e., a server. As described above, since the scanner control PC 500 of the present embodiment is realized with a general information processing apparatus such as a personal computer, there is no limitation on applications running on the PC. Port numbers of TCP/IP protocol can be freely used by respective applications, and ports used by other applications cannot be used for touch panel data communication. That is, when the virtual touch panel driver 552 operates, it searches for an available port and uses it.

Accordingly, unless the touch panel task 152 in the scanner/network connection apparatus 100 obtains the port number used by the virtual touch panel driver, the touch coordinate position information cannot be notified to the scanner control PC 500. In the present embodiment, the scanner control PC 500 notifies a port number P2 (a port number available for the scanner control PC 500) used by the touch panel task 152, in a command format discriminative from data to be displayed, to the LCD server 151 (or the SCSI server 153) using the fixed port P1.

<Processing in Scanner/Network Connection Apparatus>

Hereinbelow, a processing procedure in the scanner/network connection apparatus 100 according to the present embodiment will be described.

Figure 4:
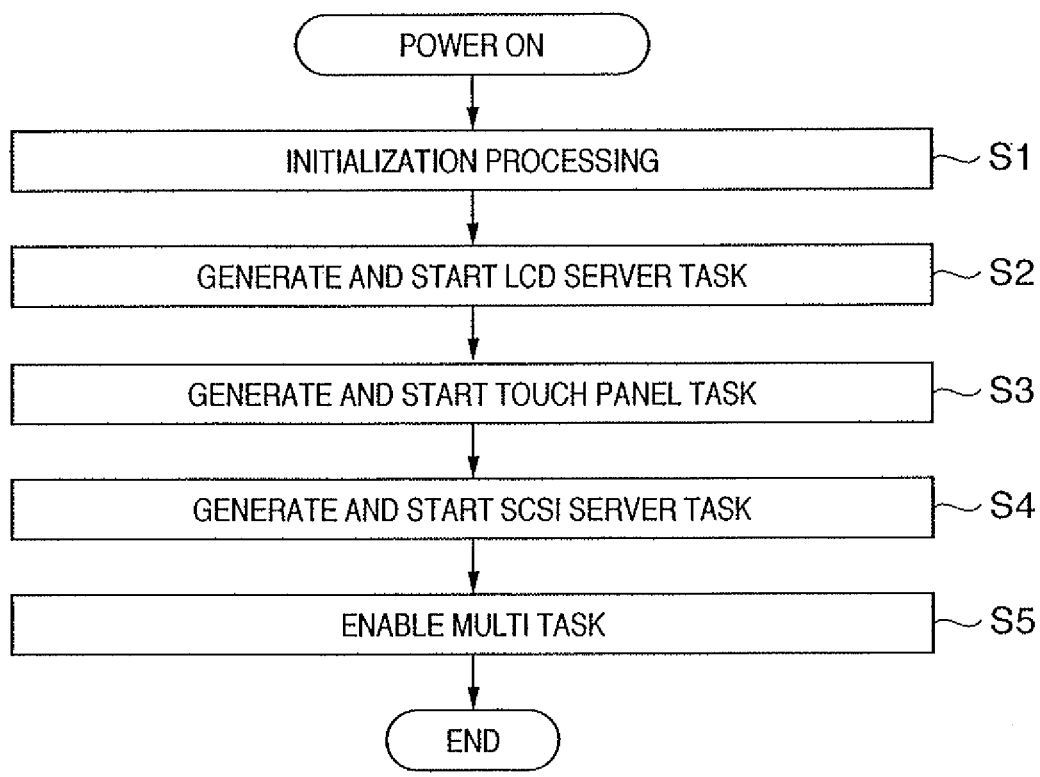
FIG. 4 is a flowchart showing a processing procedure upon power-up of the scanner/network connection apparatus according to the first embodiment.

FIG. 4 shows initial processing in the scanner/network connection apparatus 100.

When the power is turned on, initialization processing is performed. The initialization processing includes initialization of the network interface 107 and driving of the network driver 154. The network driver 154 monitors packets on the network 300 and captures a packet with an IP address (registered in a nonvolatile memory (not shown)) allocated to the apparatus, and transmits a packet onto the network. Note that the registration of IP address may be made by setting a fixed address from a setting menu (not shown) of the scanner/network connection apparatus 100 or by performing setting the apparatus as a DHCP (Dynamic Host Configuration Protocol) client.

Figure 5:
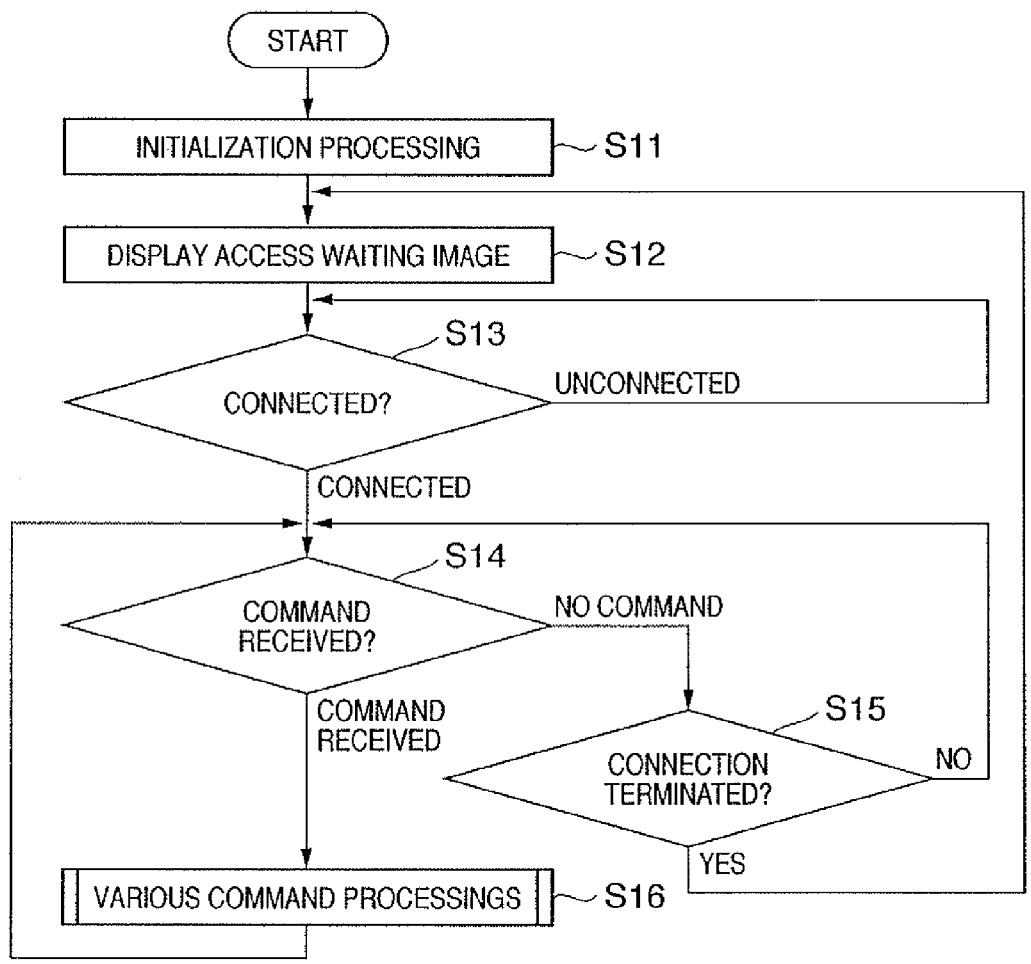
FIG. 5 is a flowchart showing a processing procedure by an LCD server which operates on the scanner/network connection apparatus according to the first embodiment.
Figure 6:
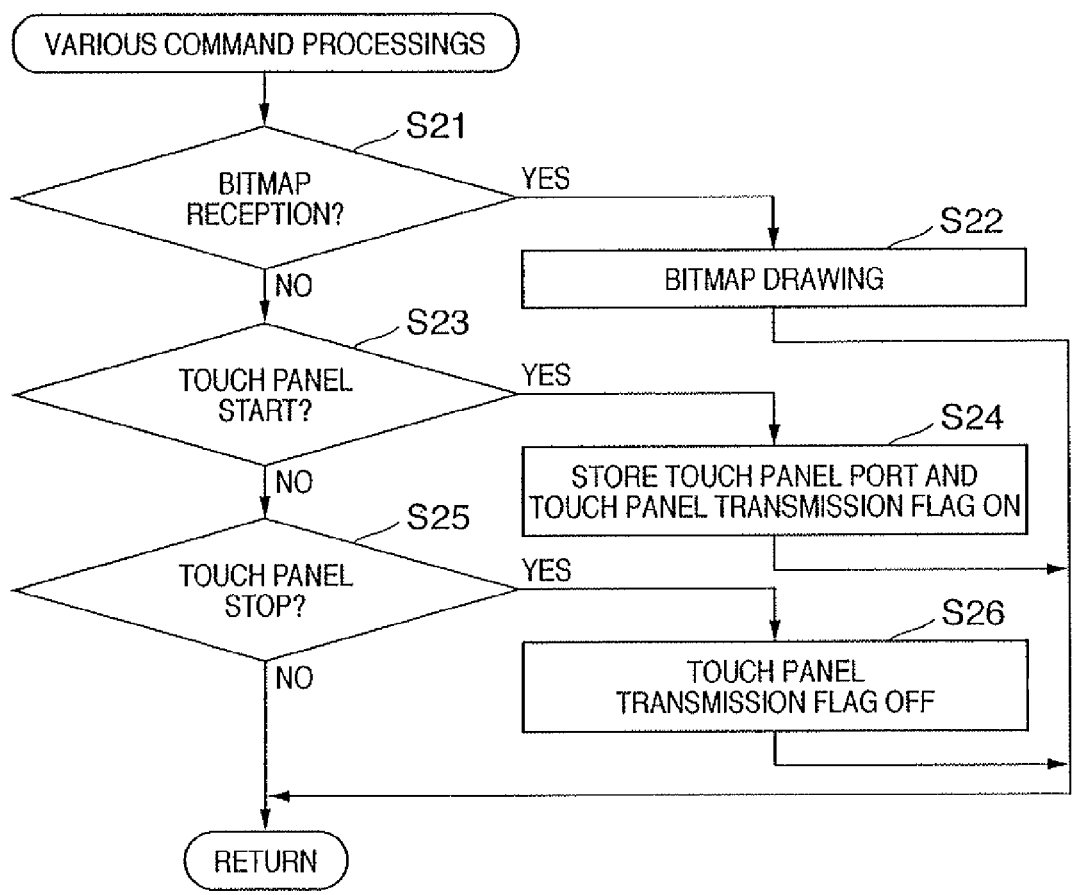
FIG. 6 is a flowchart showing the details of step S16 in FIG. 5.
Figure 7:
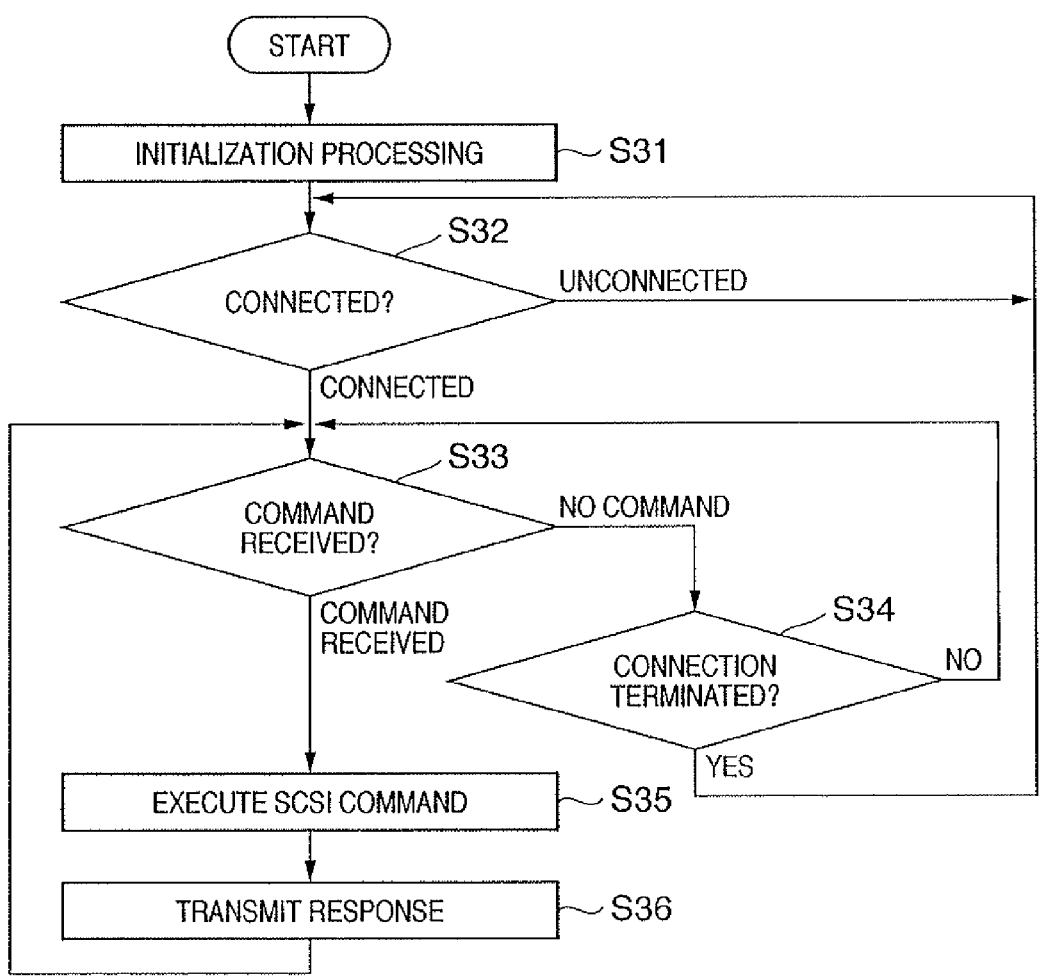
FIG. 7 is a flowchart showing a processing procedure by a SCSI server which operates on the scanner/network connection apparatus according to the first embodiment.
Figure 8:
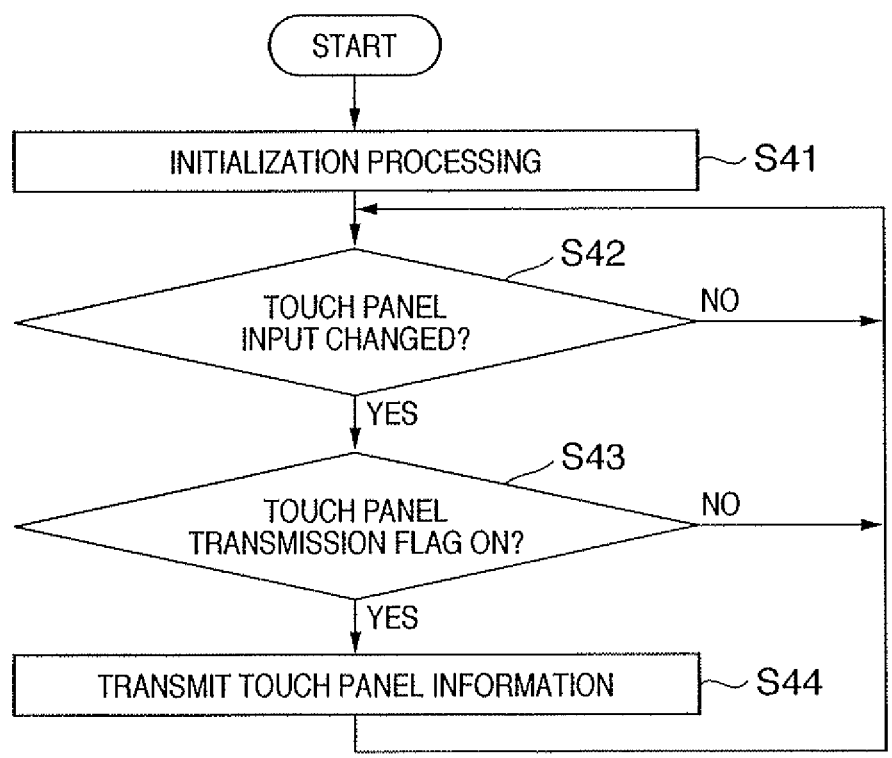
FIG. 8 is a flowchart showing a processing procedure by a touch panel task which operates on the scanner/network connection apparatus according to the first embodiment.

Next, at step S2, the LCD server task 151 is generated and started (the details are shown in FIGS. 5 and 6). Then at steps S3 and S4, the touch panel task 152 and the SCSI server task 153 are generated and started (the details are shown in FIGS. 7 and 8). Thereafter, a multi task is enabled such that these processings operate as a multi task (step S5).

In this manner, processings by the LCD server 151, the touch panel task 152 and the SCSI server 153 are started. Next, the respective processings will be described.

The LCD server 151 performs processing in accordance with the following processing procedure as show in FIG. 5.

First, at step S11, the LCD controller 105 is initialized. At step S12, a screen image indicating that access from the scanner control PC 500 is waited is displayed. This screen image is as shown in FIG. 10. As the image in FIG. 10 indicates a status prior to access from the scanner control PC 500, the scanner/network connection apparatus 100 side displays the image. Further, at this time, an IP address allocated to the network interface 107 of the scanner/network connection apparatus 100 is also displayed. As a result, even when the scanner/network connection apparatus 100 is connected as a DHCP client to the network 300, the IP can be easily discriminated.

Next, at step S13, access from the scanner control PC 500 is waited by monitoring the port P1.

When connection has been established, the process proceeds to step S14, at which it is determined whether or not a command has been received. If a command has been received, the process proceeds to step S16, at which processing corresponding to the command is performed (the details will be described in FIG. 6). On the other hand, if disconnection is notified (in the scanner control PC 500, when the scanning application has been terminated), the process proceeds to step S12, at which the next connection request is waited.

FIG. 6 shows the details of the above step S16.

At step S21, it is determined whether or not reception of bitmap data is performed. If it is determined that reception of bitmap data is performed, the following bitmap data is outputted to the LCD controller 105 based on the upper-left corner coordinate position and width and height information, thereby an image is displayed on the LCD 106. In the LCD 106, as the number of display pixels is 320×200, and a binary image is displayed, the maximum image size is 320×200 bits=64000 bits. Considering that a general network band is about 10 Mbps to 100 Mbps, the load on the network is very small and the response upon update of screen image is not degraded.

The LCD server 151 has the above sufficient function, however, since it is to determine a port of the scanner control PC necessary for the touch panel task upon transmission, the LCD server 151 controls the determination of the port and enables/disables the touch panel.

For this purpose, at step S23, it is determined whether or not a touch panel start command has been received. If the touch panel start command has been received, a port for transmission of touch panel coordinate included in the command is obtained then stored in an appropriate position of the RAM 103, and a touch panel flag indicating that the touch panel is enabled is turned ON. Note that in this description, the touch panel port number P2 is included in the touch panel start command, however, the command and the port number may be separately received.

Further, at step S25, it is determined whether or not a touch panel stop command has been received. If it is determined that the touch panel stop command has been received, the touch panel flag is turned OFF.

The touch panel task will be described later. When the touch panel flag is in an ON state, the touch position coordinate data is outputted toward the port P2 of the network address of the canner/network connection apparatus 100.

Next, a process procedure by the SCSI server in the scanner/network connection apparatus will be described with reference to the flowchart of FIG. 7.

First, at step S31, the SCSI interface 108 is initialized. Next, at step S32, access from the scanner control PC 500 is waited.

At step S33, the port P3 is monitored, thereby it is determined whether or not a command regarding the SCSI has been received from the scanner control PC 500. If the command has not been received, the process proceeds to step S34, at which it is determined whether or not a disconnection notification command has been received. If the disconnection notification command has been received, the process returns to step S32, otherwise, returns to step S33.

On the other hand, if it is determined that the command regarding the SCSI (except the disconnection command) has been received, the process proceeds to step S35, at which the received SCSI command is executed. That is, the SCSI interface 108 is caused to perform command processing. As a result, a response is returned from the scanner 200 connected to the SCSI interface 108, then the response is received, and the received data is outputted toward the port P3 of the scanner control PC.

As described above, the processing by the SCSI server 153 is simply causing the SCSI interface 108 to perform the SCSI command received from the network and notifying the result of SCSI command processing returned from the SCSI interface 108 (including data obtained by reading an original) to the scanner control PC 500.

Generally, a device connected to a SCSI interface (in the case of 8-bit data bus) has an ID of 0 to 6 (ID=7 is often allocated to the Host SCSI interface). Further, at an initial stage, scanning for the respective IDs is performed on the SCSI interface to detect whether or not a device with any one of the IDs is connected to the interface. If a device with one of the IDs is connected to the interface, the device is detected, then result of detection is held by an OS, and thereafter, communication with the SCSI device is performed using the ID.

Also, in the present embodiment, as the virtual SCSI driver and the SCSI server of the scanner control PC 500 perform similar processing, the SCSI device connected to the SCSI interface is detected on the scanner control PC 500 side. In other words, in the SCSI server 153 of the present embodiment, the ID of the connected scanner 200 is not necessary.

Next, a processing procedure by the touch panel task 152 in the scanner/network connection apparatus 100 will be described with reference to the flowchart of FIG. 8.

First, at step S41, initialization processing is performed. Next, at step S42, it is determined whether or not the user's panel-touch input to the touch panel 104 has been changed, and the change has been waited. Note that the change in touch input means a change by depression of the touch panel from a non-contact state and a change by release of the depressed state. In the case of the latter change, insignificant coordinate data or data with attribute information as to whether or not the panel has been touched may be transmitted.

If it is determined that the touch input has been changed, the process proceeds to step S43, at which it is determined whether or not the touch panel flag is ON. As described above, the touch panel ON/OFF control is made by the LCD server 151. If it is determined that the touch input has been changed and the touch panel flag is ON, the touch coordinate data (it can be discriminated whether the panel has been touched or a touched state has been released) is outputted to the port P2 of the scanner control PC 500 stored at step S24 in FIG. 6.

The processing in the scanner/network connection apparatus 100 according to the present embodiment is as described above.

<Scanning Application>

Next, the scanning application which operates on the scanner control PC 500 will be described.

Note that in the following description, terms "to display", "touch input", "image input" and the like mean processing from the viewpoint of the scanning application side. For example, display processing by the scanning application is performed on the virtual LCD driver 551. The virtual LCD driver 551 generates bitmap data in accordance with the request, then transmits the data to the port P1 of the IP address of the scanner/network connection apparatus 100, to display an image on the remote LCD 106. The "touch input" and the "image input" (reading instruction to the scanner) mean processings performed in a similar manner.

Figure 9:
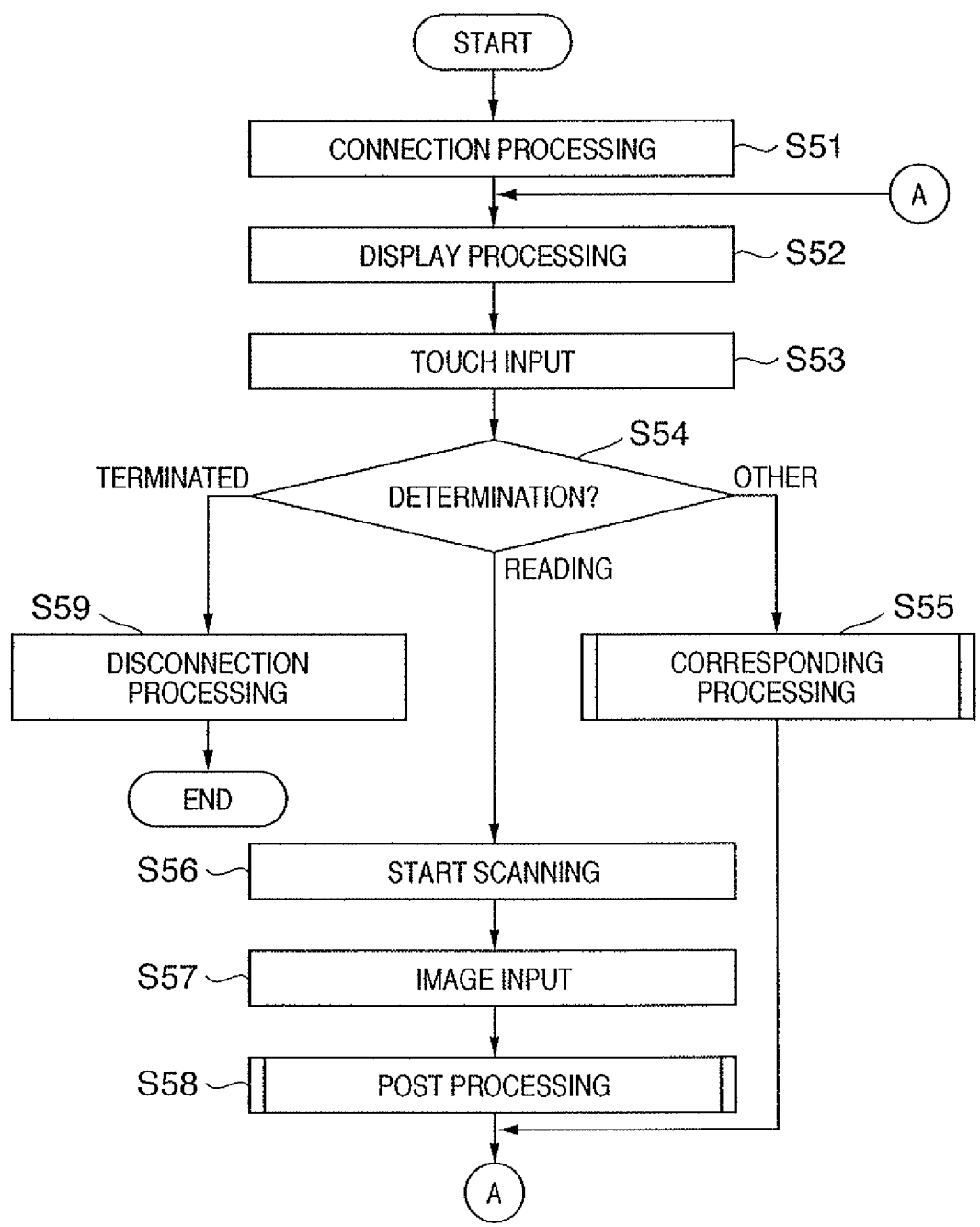
FIG. 9 is a flowchart showing the content of processing by a scanning application which operates on the scanner control PC according to the first embodiment.

FIG. 9 is a flowchart showing the content of processing by the scanning application.

The scanning application is stored in the hard disk 509 of the scanner control PC 500. The application is started by the user or automatically started in accordance with start of the PC.

First, at step S51, connection with the scanner/network connection apparatus 100 via the network 300 is established. The connection processing includes processing of establishing connection with the ports P1 and P3 of the IP address of the scanner/network connection apparatus 100 and processing of searching for a port P2 available for touch data reception and notifying the port (touch panel flag ON command).

Next, at step S52, image display processing for display on the LCD 106 is performed, then at step S53, a touch input is performed, and at step S55, processing corresponding to the touch input is performed. The processing at steps S52, S53 and S55 is repeated, thereby the user's input and a response screen image to the user's input are sequentially updated in the scanner/network connection apparatus 100. When the screen image has been changed, processing of drawing an image corresponding to the change is performed at step S52, and the user performs an input in correspondence with the image. Note that in the scanning application, when touch-input coordinate information is obtained, as the screen image displayed immediately before the touch input is known, i.e., coordinate positions of the various buttons to be operated by the user are known, the content of designation by the touch coordinate information is already known. Further, as a rule, processing on the button touched by the user is performed when the touched state has become an untouched state. When an untouched state has become a touched state, a highlighted image of the touched button or the like is transferred.

Further, as it will be apparent from the following description, in the loop of the above steps S52, S53 and S55, the user's various settings are registered.

The user performs various settings while processing of updating the screen image is performed in accordance with necessity. Finally, if it is determined that coordinate information corresponding to a scan start instruction has been received, the process proceeds from step S54 to step S56, at which the scanner driver is instructed to perform reading. As a result, the virtual SCSI driver 553 sends the instruction command to the port P3 of the IP address of the scanner/network connection apparatus 100, to start scanning. Then, image data obtained by reading an original is sent from the scanner/network connection apparatus 100. The virtual SCSI driver 553 outputs the data to the scanner driver, thus the data is finally delivered to the scanning application (step S57).

When the reception of read image data has been completed, the scanning application performs post processing on the image data in accordance with the setting made in the previous setting processing (the loop of steps S52, S53 and S55).

In the present embodiment, as the post processing, the following processings are realized.
1. storage of read image into a desired file server (designated by the user) and setting of storage file format
2. facsimile transmission (transfer to a facsimile server)
3. transmission as an attachment file of electronic mail
4. FTP transfer to a server and setting of storage file format
5. printing from a desired printer server
6. combined processings of 1 to 5

These processings will be described later.

Further, in FIG. 9, if termination of the scanning application is instructed (the instruction is made on the scanner control PC 500), disconnection processing (including a touch panel flag OFF command) is performed at step S59, and the present processing ends. Note that the scanning application may always be in operating condition.

Next, for understanding of particular contents of the processing by the scanning application, a description will be made with reference to FIGS. 10 to 38.

FIG. 10 illustrates a screen image displayed on the LCD 106 of the scanner/network connection apparatus 100 prior to the start of the scanning application on the scanner control PC 500.

Figure 11:
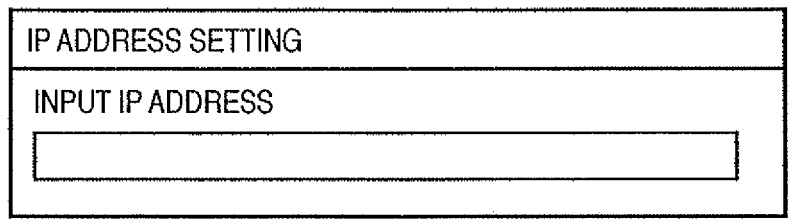
FIG. 11 is an example of a screen image on the scanner control PC for inputting an IP address of the scanner/network connection apparatus according to the first embodiment.

When the scanning application is started, connection is established as described above, however, in a case where the scanning application is first installed in the scanner control PC 500 and is started, as the IP address of the scanner/network connection apparatus 100 is unknown, an image as shown in FIG. 11 is displayed on the scanner control PC 500 such that the IP address of the scanner/network connection apparatus 100 is inputted and registered. The registration is made by storing the IP address in a HDD or the like, and the input of the IP address is not required from the next start of the scanning application.

Figure 12:
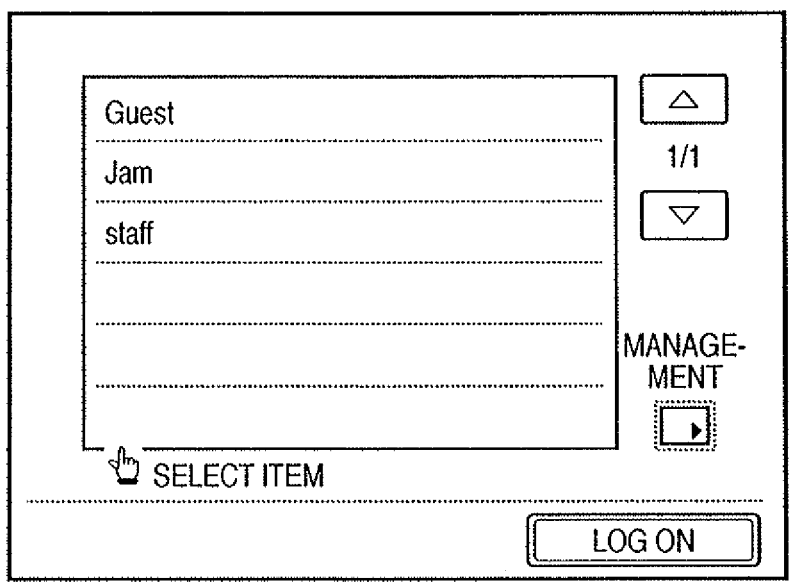

When the connection has been established, the scanning application causes the virtual LCD driver 551 to draw an image as shown in FIG. 12 to display an initial image on the LCD 106 of the scanner/network connection apparatus 100. As shown in FIG. 12, as the image is to be displayed on the entire screen of the LCD 106, the virtual LCD driver 551 draws an image of display position (0, 0), having a size of 320 (width)×200 (height), and transmits the bitmap image toward the port P1 of the IP address of the scanner/network connection apparatus 100 (this operation corresponds to step S52 in FIG. 9).

In FIG. 12, the user touches one of a name "Guest" (a name of general unspecified user), a user name "Jam" or a user name "staff". For example, if the user touches the name "Guest", the coordinate position information is notified to the scanner control PC 500 (this operation corresponds to step S53 in FIG. 9). As a result, the scanning application detects the name based on the coordinate data, and temporarily stores the content of the selection on the RAM 503 (this operation corresponds to step S55 in FIG. 9).

Then, to notify that the "Guest" has been touched, a highlight image of the portion (inverted image) is generated, and the virtual LCD driver 551 is instructed to display the image. Further, as the selection of a log in user name has been made, to indicate that a "log on" button functions, the "log on" button is also displayed by the virtual LCD driver 551. The virtual LCD driver 551 transmits the bitmap image to be displayed toward the port P1 of the scanner/network connection apparatus 100, thereby updates the display screen image (this operation corresponds to step S52 in FIG. 9).

Figure 13:
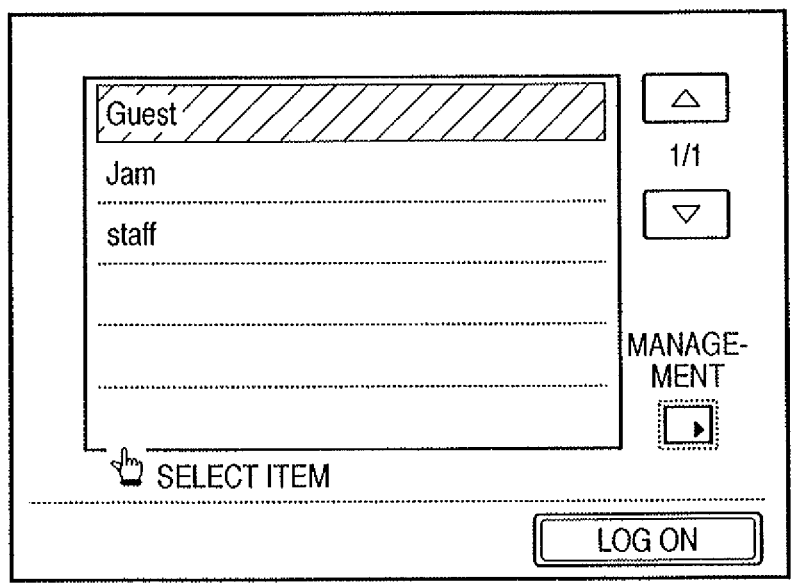

As a result, the LCD 106 of the scanner/network connection apparatus 100 is updated from the image as shown in FIG. 12 to an image as shown in FIG. 13.

Hereinbelow, a description will be briefly made about a case where communication is similarly performed between the scanner control PC 500 and the scanner/network connection apparatus 100.

In the image as shown in FIG. 13, when the "log on" button is touched, an image as shown in FIG. 14 is displayed in the LCD 106. FIG. 14 shows an image for setting an output destination upon reading of an original image set on the scanner 200. Basically, when this image is displayed, to determine a transmission destination, a "destination list" is touched, thereby a list of destinations is displayed, and necessary destination(s) is sequentially selected.

Figure 15:
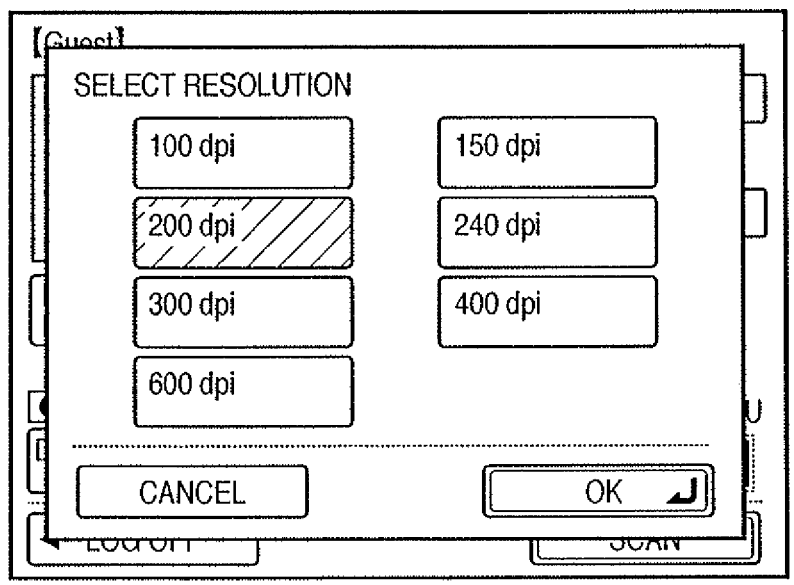

Note that as it is understood from display "200 dpi" in FIG. 14, the default reading resolution is 200 dpi. To change the resolution, the display portion is touched, thereby an image as shown in FIG. 15 is displayed (a front window image is drawn and its position and size and bitmap data are transferred).

Figure 16:
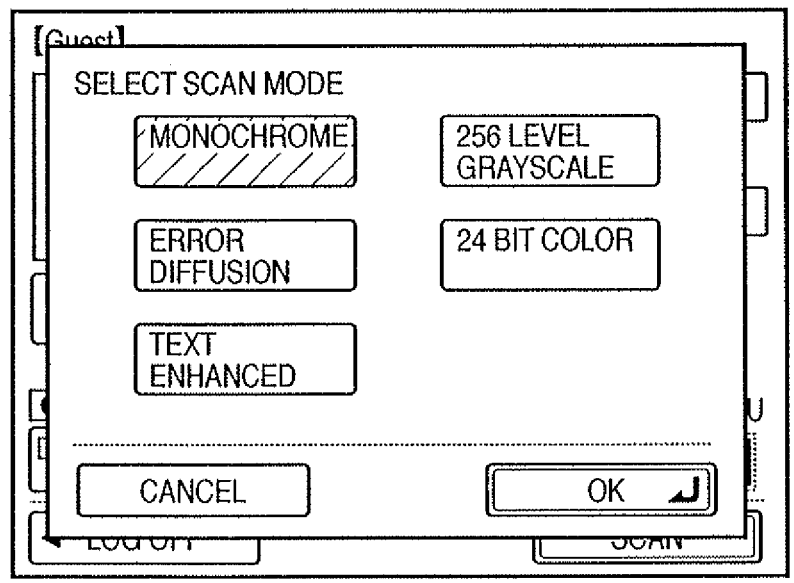
Figure 17:
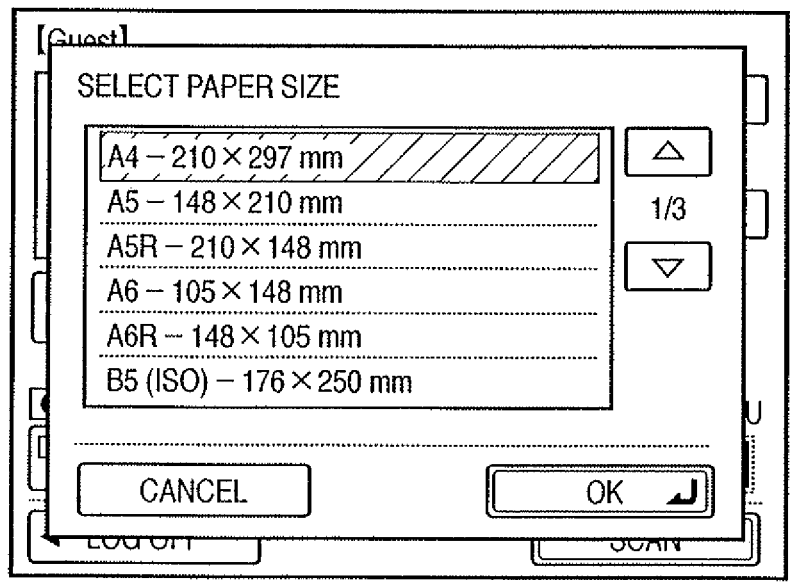
Figure 18:
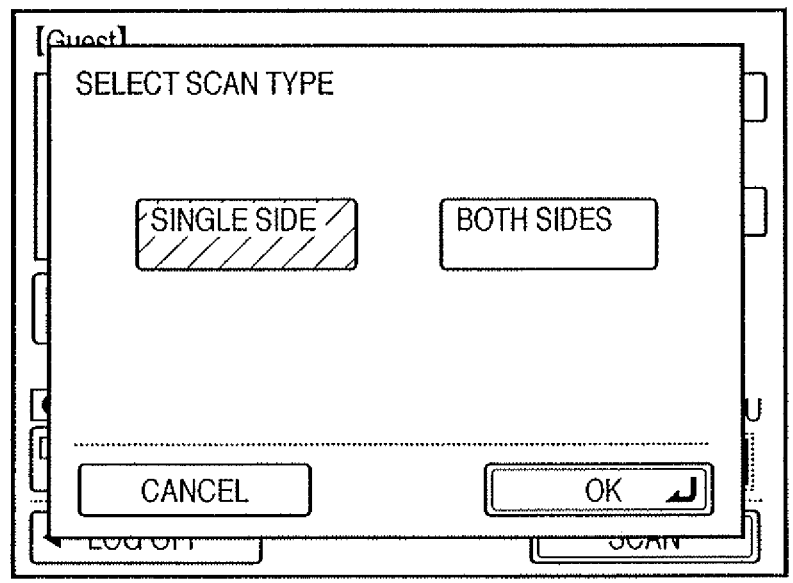

Further, in FIG. 14, if a "gray (monochrome 256 level)" button is touched, a reading mode designation image as shown in FIG. 16 is displayed. If an "A4" button is touched, an original size designation window as shown in FIG. 17 is displayed. Further, if a "single side" button is touched, a single side/both sides selection window as shown in FIG. 18 is displayed. In the windows as shown in FIGS. 15 to 18, a desired item is touched and an "OK" button is touched, and an image similar to the image as shown in FIG. 14, reflecting the result of selection, is displayed.

Generally, an application or the like makes an inquiry about a reading resolution, a reading original size and further a reading mode (monochrome binary, monochrome multi-level, color multilevel etc.) as reading levels, to a scanner driver attached to a scanner (generally installed from a CD-ROM), and a response is returned from the scanner driver. The images as shown in FIGS. 15 to 18 are drawn based on such data obtained from the driver of the scanner 200 of the present embodiment. In other words, the display images as shown in FIGS. 15 to 18 are determined based on functions which can be selected in accordance with the combination of the scanner 200 and the scanner driver.

Further, regarding the designation of reading mode, two processing methods for performing error diffusion on an original image and reading the image are known. In one method, the scanner itself has various reading modes and reading of an original is performed in one of the mode in correspondence with a mode designation command. In the other method, the scanner reads a multilevel image in the same resolution, and the scanner driver performs resolution conversion or the like.

In the former combination of the scanner and the scanner driver, when the reading mode is designated from the scanning application, the scanner driver outputs the SCSI command to the virtual SCSI driver 553. As a result, the SCSI server of the scanner/network connection apparatus 100 outputs the command to the scanner connected to the apparatus.

Further, in the latter case, as the scanner driver performs processing by itself, a command corresponding to a set mode is not outputted to the virtual SCSI driver.

That is, as long as the combination of the scanner 200 and the scanner driver is proper, an unknown command is not issued to the scanner 200. Accordingly, it can be easily understood that the virtual SCSI driver of the present embodiment substantially does not select actually-used scanner and scanner driver, and that, even if a new single scanner device is introduced, the scanner can be utilized as a network scanner.

Figure 19:
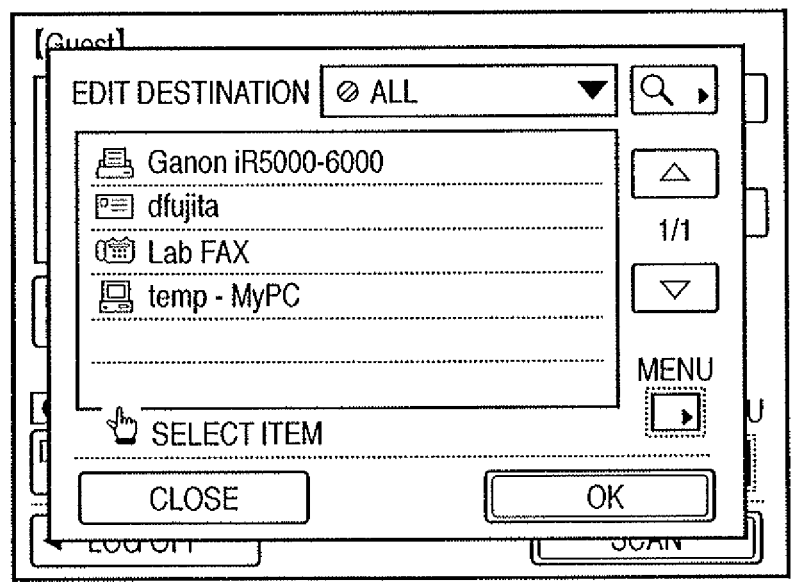

In the image in FIG. 14 (or when the various settings have been made in the image in FIG. 14, the selected destination is displayed), if the "destination list" is touched, the scanning application refers to an address book for the "Guest" in the HDD 599 since the designated log-on user is "Guest" in the scanner control PC 500, and displays an image as shown in FIG. 19 to display a registered list of destinations by using the virtual LCD driver.

As shown in FIG. 19, an image of destination list is displayed. The image of destination list shows a destination list, a destination search button (of a magnifying glass icon), an edit button for addition/deletion of destination, a scroll button, a close button and the like.

In FIG. 19, 4 destinations are displayed in the area of the destination list since 4 destinations are registered in the address book of the user "Guest". A combo box button "all" is used for designation of destinations by category. For example, in the case of facsimile transmission, if this button is touched and facsimile transmission is selected, only destinations registered for facsimile transmission are displayed. In FIG. 19, as "all" is selected, the registered destinations of all categories are displayed.

Figure 20:
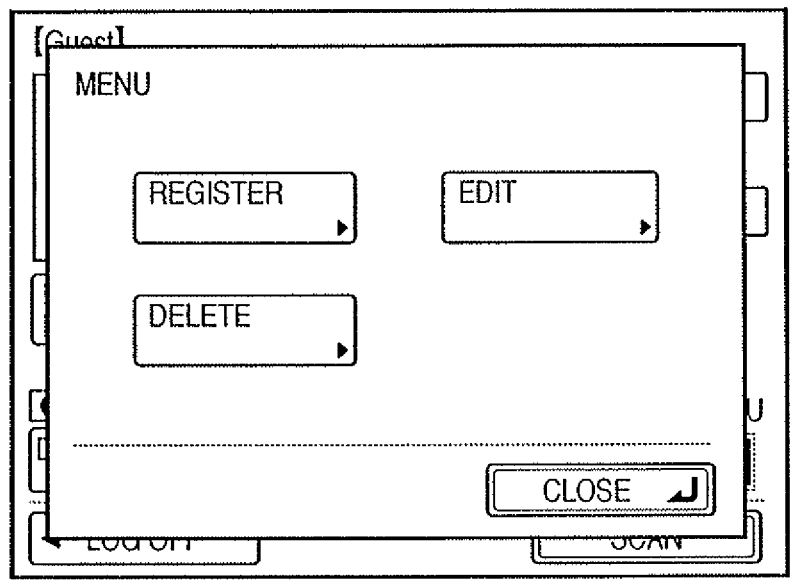

Further, if a "MENU" button is touched, an image as shown in FIG. 20 is displayed for editing the address book of the log-on user at that time (in this case, the address book of the user "Guest"). In FIG. 20, the image has a "register" button for registration of a new address, an "edit" button for editing a registered destination, a "delete" button for deletion of a registered destination, and a "close" button indicating termination.

Figure 21:
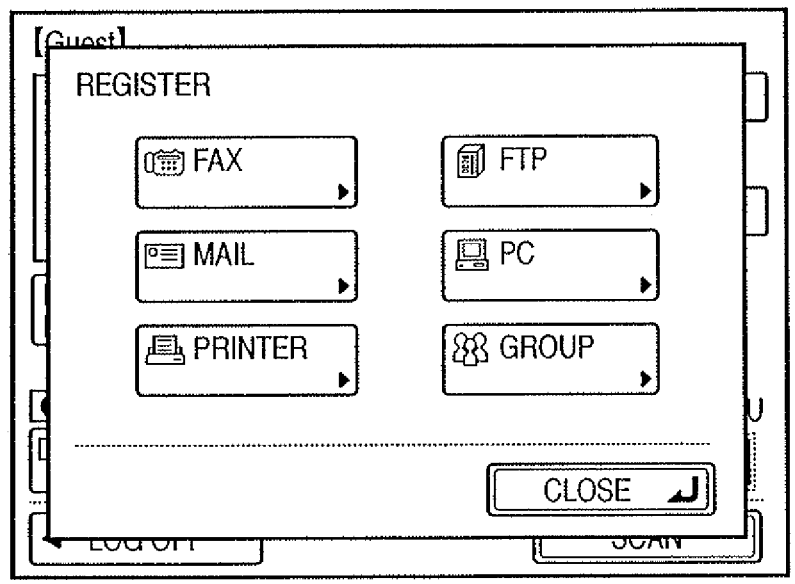

In FIG. 20, if the "register" button is touched, an image as shown in FIG. 21 is displayed. In the present embodiment, as an image transmission method, "facsimile", "mail", "PC (file server)", "printer" or "group" can be designated. Note that "group" means transmission to plural destinations like facsimile broadcast transmission, however, in the "group" transmission, transmission can be performed even if categories are mixed.

Figure 22:
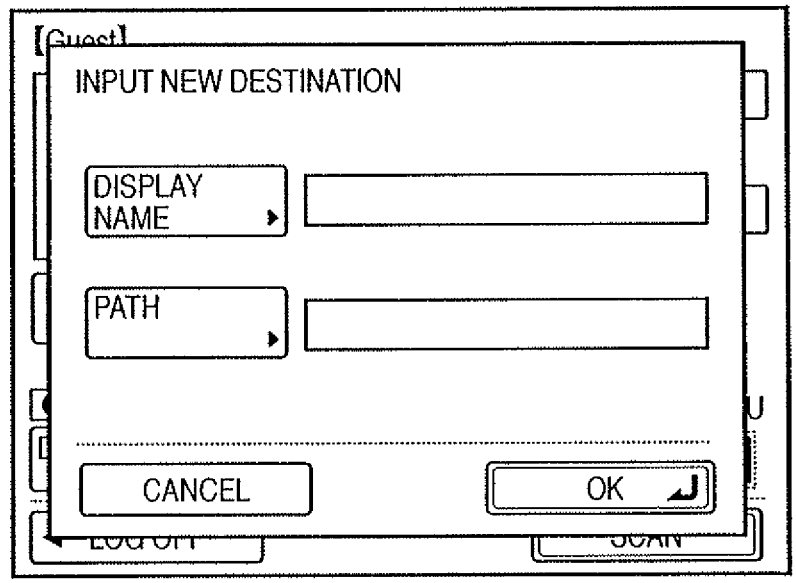

If the "PC" button is touched, an image as shown in FIG. 22 is displayed, and a display name and a pass name on the network of the destination are inputted in the image.

When a "display name" button is touched, as a keyboard image as shown in FIG. 23 is displayed, desired key-inputs are sequentially made. Upon each key input, an input letter is displayed in a cursor position, as a result of drawing of a character image in the corresponding position in the display field. As a character image is at most several 10×10 dots in size, the amount of information transferred by the virtual LCD driver is very small and a sufficient response to a touch input can be obtained. That is, an operation environment as if the processing is made within the scanner/network connection apparatus 100 can be provided to the user.

Figure 24:
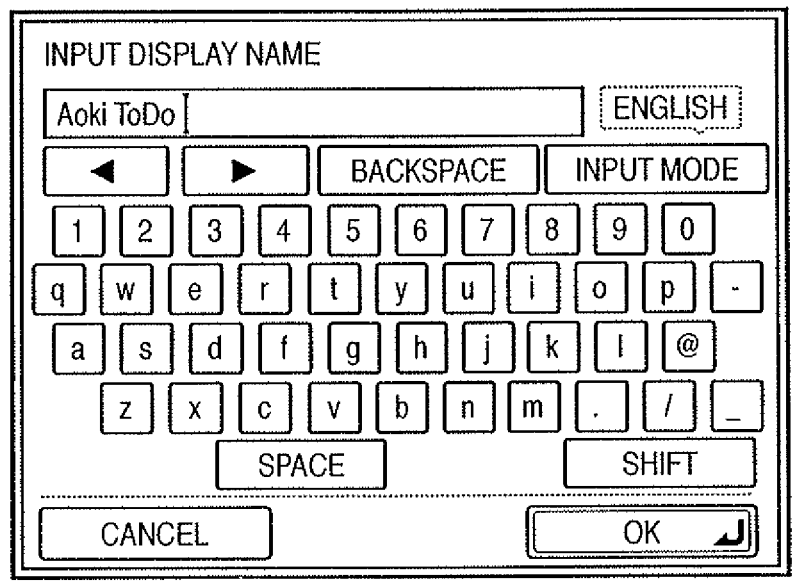

FIG. 24 shows an example where "Aoki ToDo" is inputted as a display name to be registered. If the user makes a mistake or wants to insert a letter, a cursor movement button and a backspace buttons can be used. Further, if a "shift" button is touched, each displayed letter is changed to a capital letter (an image of capital letter is drawn). In the scanner control PC 500, upon each key-input using the virtual keyboard, the depressed key is determined from the coordinate data, and if the key is a letter key, the character code is stored, or if the key is a correction key or the like, processing to correct a stored character string or the like is performed.

In this manner, when the registration of display name has been completed, an "OK" button in FIG. 24 is touched, thereby the character string "Aoki ToDo" is inputted in the input field of the display name in FIG. 22 (the scanner control PC can obtain the character string code).

Figure 25:
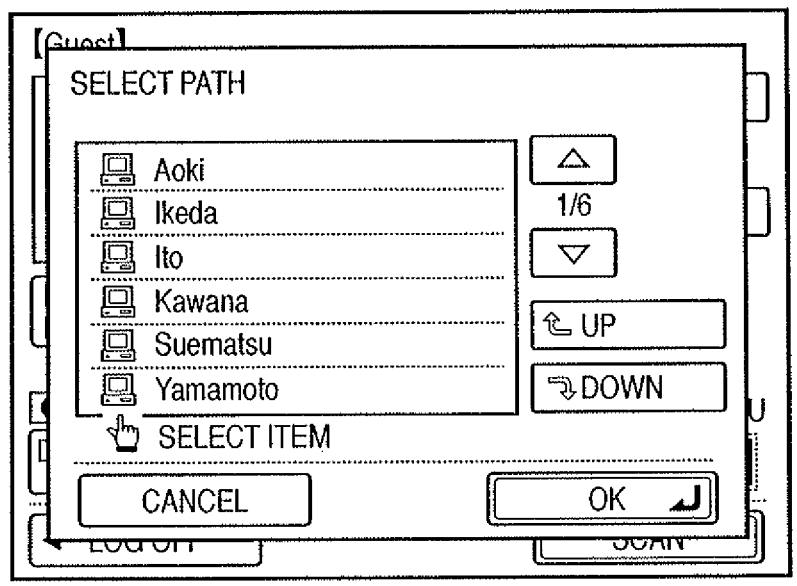

Further, in FIG. 22, if a "path" button is touched, an image as shown in FIG. 25 is displayed. This image is based on information obtained by scanner control PC 500 by browsing file server PCs on the network. Generally, in a network by Microsoft Corporation, as a browse master PC manages PCs (servers) on the network, the information on the file servers on the network can be obtained from the browse master.

In FIG. 25, a server as a network pass name of the registered name "Aoki ToDo" is selected. In a case where a server not displayed in the image is selected, the scroll button (one of 2 triangular buttons displayed in a upper-right position) is touched such that the image is scrolled and a desired server is found. To the user's eye, the image is scrolled, however, actually, every time the scroll button is touched, the scanning application cases the virtual LCD driver 551 to draw a bitmap image in the area to display the server list, and the result of drawing is displayed on the LCD 106.

Figure 26:
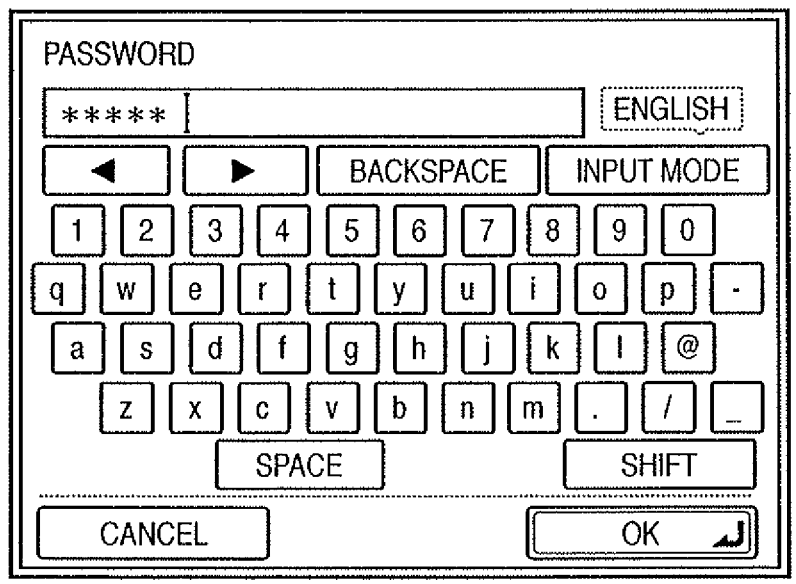

In this example, a server "Aoki" is selected. When the server "Aoki" is touched, the scanner control PC 500 tries to obtain shared resources of the server "Aoki". The user name at this log-on is the user logged on the scanner control PC 500. In a case where a log in password is set in the server "Aoki", as the server asks password-input, a password input image is displayed as shown in FIG. 26. In FIG. 26, a virtual keyboard is displayed, then a password is inputted by key-inputs. As the scanner control PC 500 has detected the request for password-input from the server "Aoki", a character image "*" is drawn regardless of input letter and displayed on the LCD 106 for protecting respective key-input letters of the password. Finally, when the password-input has been completed, an "OK" button is touched. If the input password does not correspond with the password set in the server "Aoki", the server asks password-input again. If the input password corresponds with the set password, a list of shared names set in the server "Aoki" is displayed as shown in FIG. 27. when a desired shared name is selected and finally an "OK" button is touched, the setting of newly-registered name and its path is completed.

Figure 27:
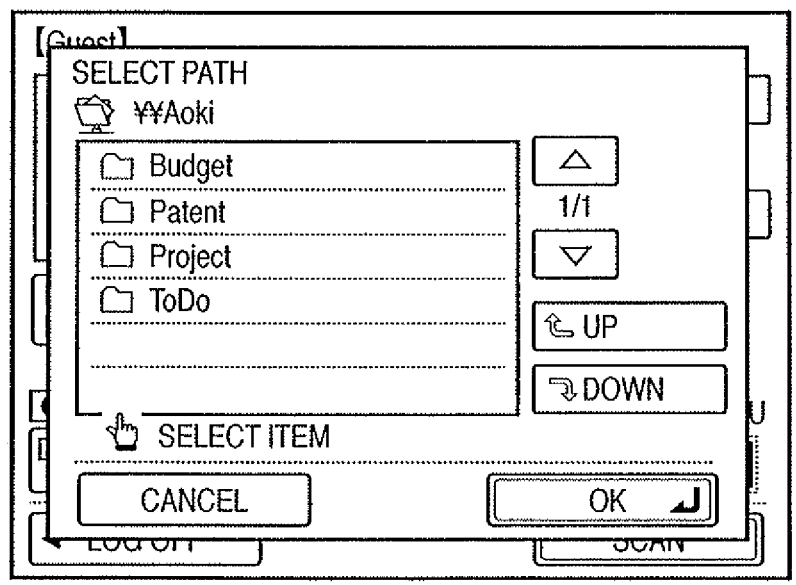
Figure 28:
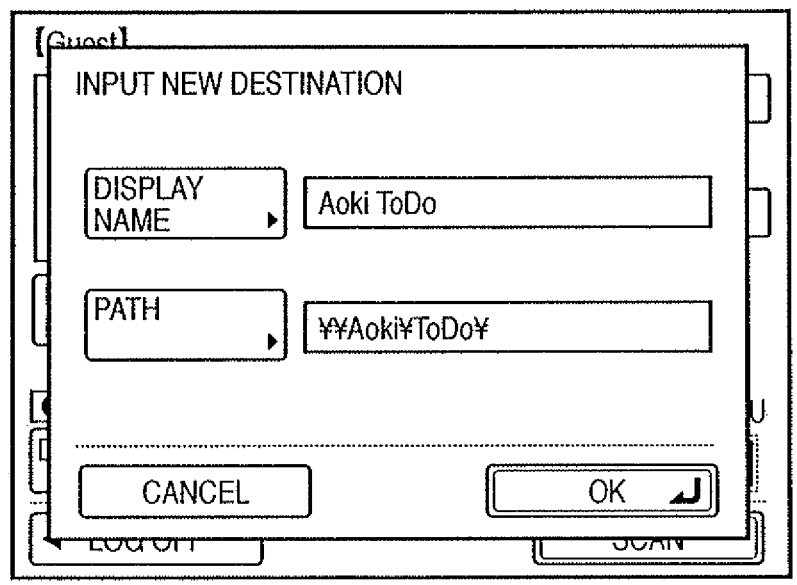

FIG. 28 shows an image resulted from selection of a shared resource name "ToDo" set in the server "Aoki" and the "OK" button in FIG. 27, i.e., the result of input in the above-described FIG. 22. As the "OK" button is touched, the file-shared resource "¥¥Aoki¥ToDo" is registered as an abbreviated display name "Aoki ToDo" in the address book of the log in user "Guest" in the scanner/network connection apparatus 100.

The registration of file server is as described above, and further, in the case of printer server, as the printer server also exists on the network 300, the registration can be performed in a similar manner. However, as "mail", "facsimile", "FTP" and the like are categories on the Internet outside the network 300, the destinations cannot be browsed on the network 300. Next, registration of a mail destination when the "mail" has been touched in the image in FIG. 21 will be described.

Figure 29:
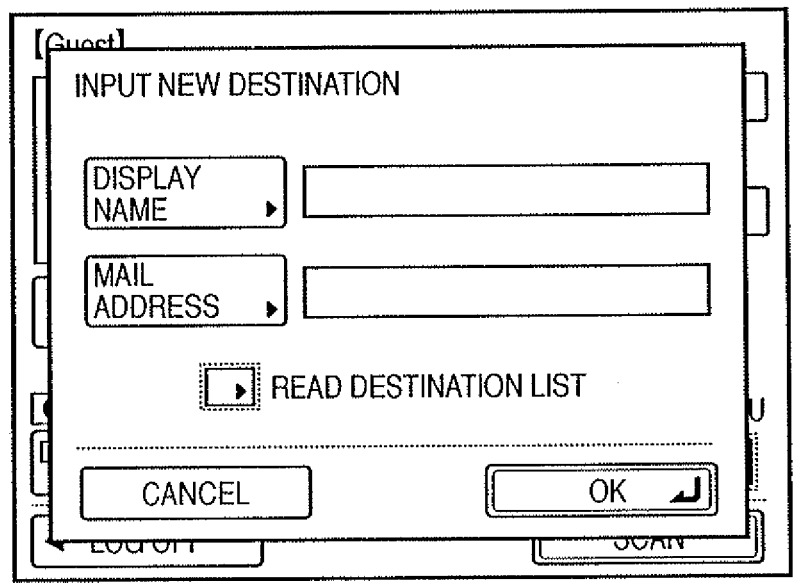
Figure 30:
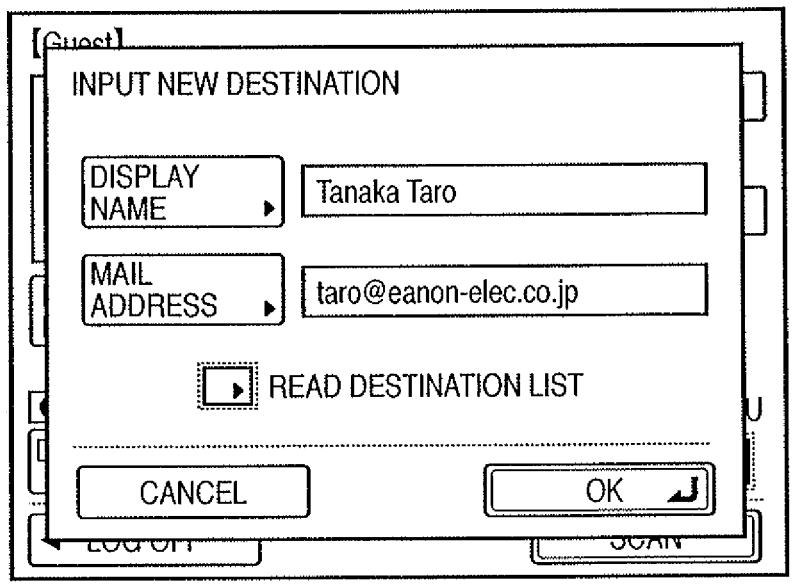

In this case, an image as shown in FIG. 29 is displayed for inputting a display name and a mail address. A virtual keyboard as shown in FIG. 23 is displayed for this purpose. FIG. 30 shows an image when the display name and mail address have been inputted. If an "OK" button is touched, a new mail destination name "Tanaka Taro" is registered.

Figure 31:
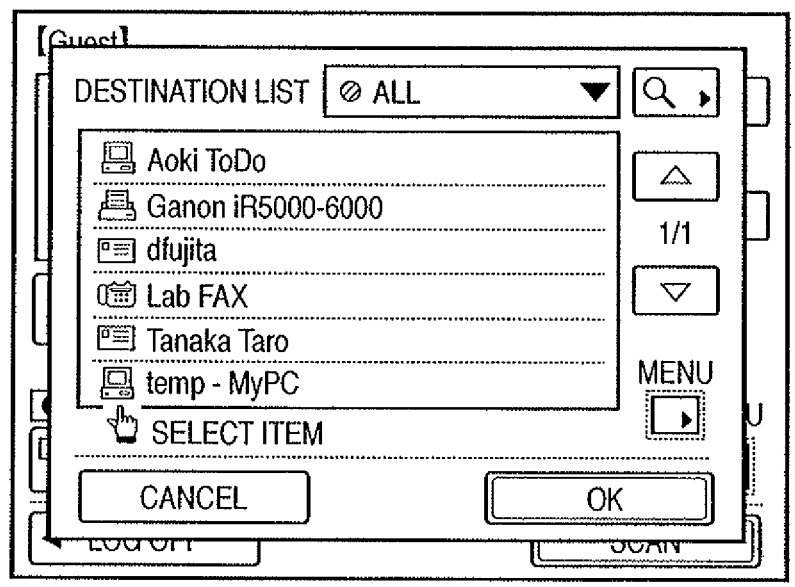

As described above, a file server as the destination of read original data +its shared name (generally a directory name) and a mail destination are registered, and when the image of destination list (FIG. 19) is displayed, the contents of new registration are reflected in the image (See FIG. 31).

Figure 32:
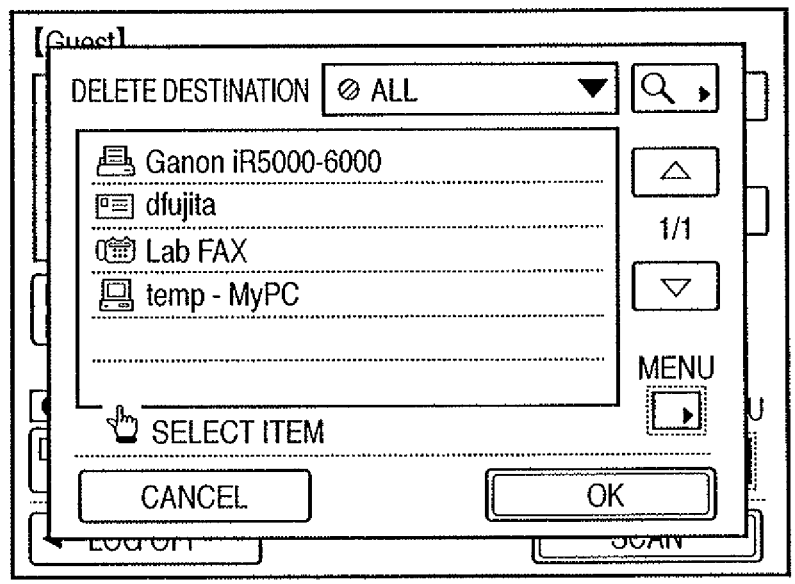

The processing when the "register" has been touched in FIG. 20 is as described above. In FIG. 20, if the "delete" button is touched, the registered data can be deleted. FIG. 32 shows a deletion image. First, a destination to be deleted is touched, then, an "OK" button is touched, thereby the destination is deleted.

Note that in FIG. 20, if the "edit" button is touched, the list of registered destinations is displayed, then a desired destination is selected from the list and the data of the destination can be edited. This processing is conceivable for a person skilled in the art.

The registration of destination and the like has been described as above. In the above description, the user name upon log-on the scanner/network connection apparatus 100 is "Guest". In a case where another log-on user name is selected, the processing is performed in accordance with an address book of the user name.

Next, processing in a case where a "transmission setting" button is touched in FIG. 14 will be described.

Figure 33:
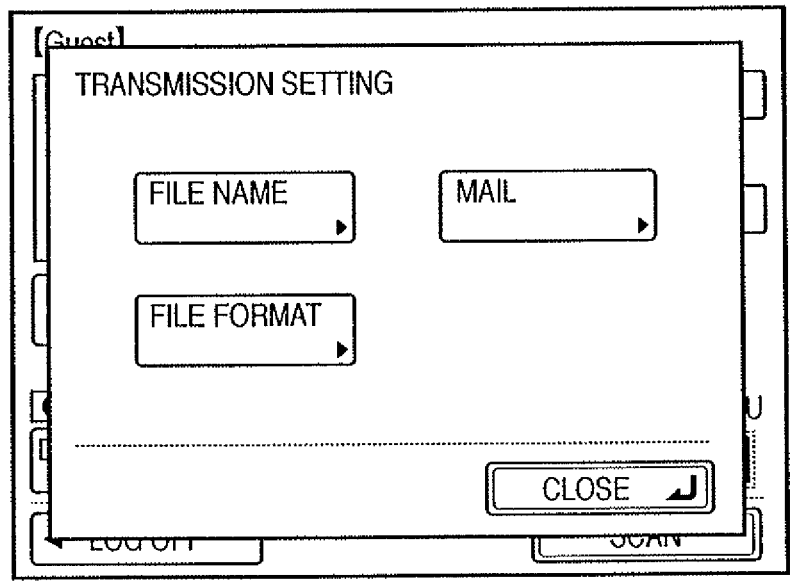

FIG. 33 shows an image displayed when the "transmission setting" button has been touched. As shown in FIG. 33, a "file name" button, a "file format" button and a "mail" button are displayed.

Figure 34:
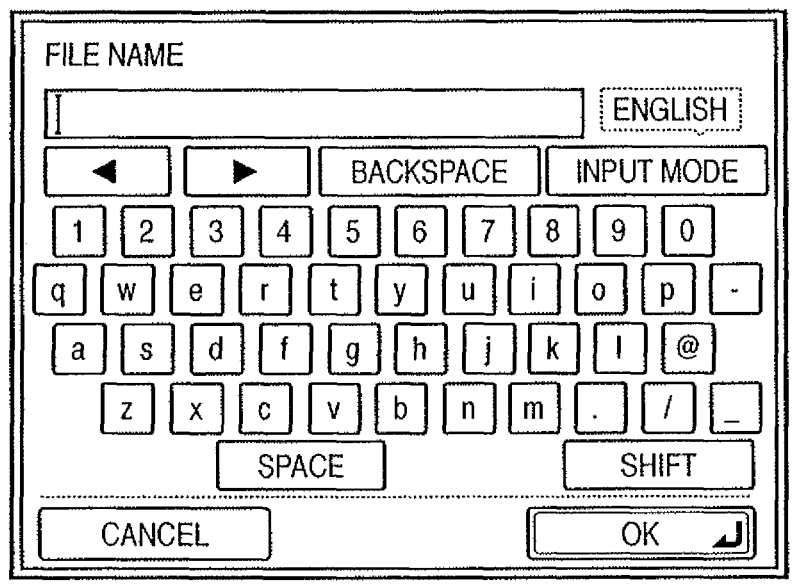

If the "file name" button is touched, a virtual keyboard is displayed as shown in FIG. 34 such that a file name upon storage of original image in a transmission destination (accordingly, the file name is effective when a PC as the transmission destination or FTP is designated) can be set by key-input. Note that the file name upon actual transmission of image data to a designated destination is a "character string of user-input file name + input date and time".

Figure 35:
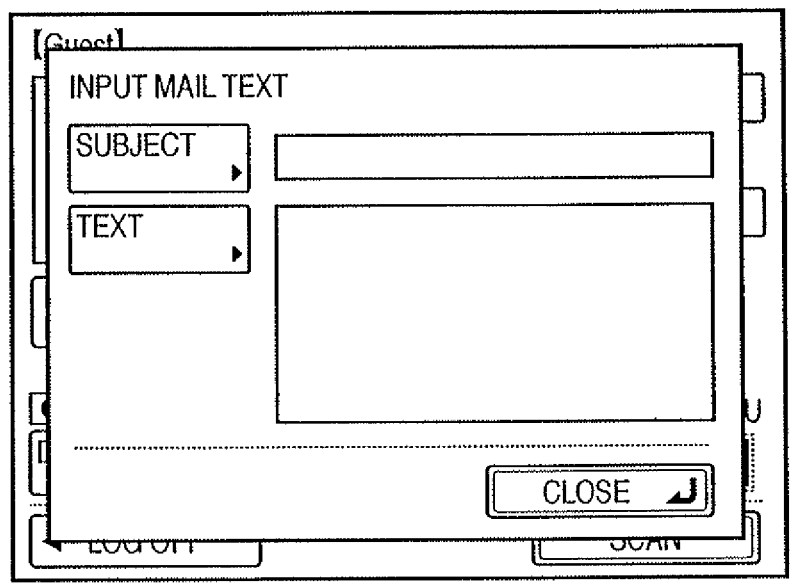

Further, in FIG. 33, if the "mail" button is touched, as in the case of general mailer software program, an image for input of subject and text is displayed as shown in FIG. 35. As the subject and text are inputted using a virtual keyboard displayed when the respective buttons have been touched, a detailed description of the key-input of the subject and text will be omitted.

Further, if the "file format" button is touched, an image as shown in FIG. 36 is displayed. As a file format, one of monochrome (binary), grayscale and color formats can be selected. Further, in FIG. 36, as a default setting, multi TIFF (file format expanded from TIFF format for plural pages) is set as a "monochrome" format, and PDF (file format proposed by Adobe Systems Incorporated) are set as "gray" and "color" formats. Note that these default file formats can be changed by user ("Guest" in this case).

Figure 37:
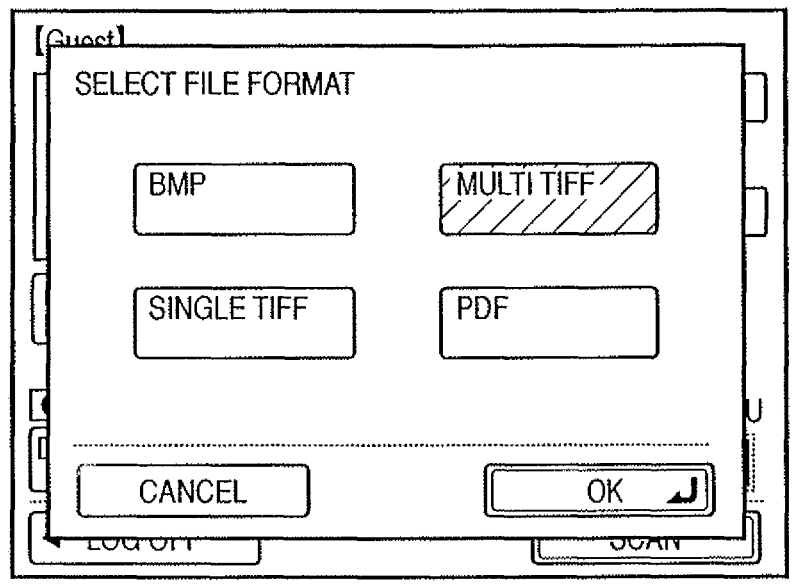

If the current "monochrome" format is to be changed, a "change" button of the "monochrome" is touched. As a result, an image where previously-selected format is inverted as shown in FIG. 37 is displayed. The user can select a desired format and touches an "OK" button, thereby change the "monochrome" format.

Note that once the format has been changed, the result of change is reflected in the next default setting (the scanner control PC 500 stores the file formats by user).

Figure 38:
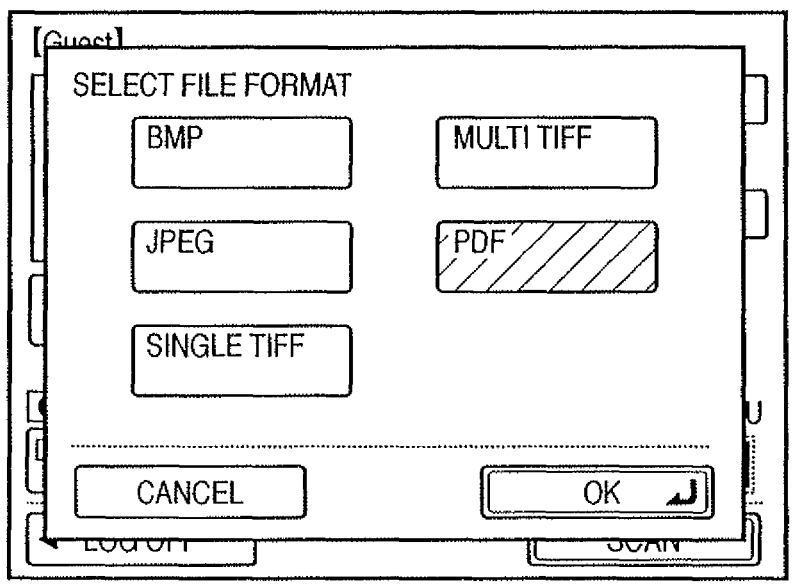

Further, in FIG. 36, if the "change" button of "color" is touched, an image as shown in FIG. 38 is displayed. The difference from FIG. 37 is that as a color format is selected, "JPEG" is added. The change is made in a similar manner to that in FIG. 37.

As described above, the setting of reading resolution, the registration of destination, the file name, the file format, the mail setting and the like can be freely performed by the user utilizing the user interface of the scanner/network connection apparatus 100. In any way, the user touches one or more desired destinations and touches the "OK" button in the image as shown in FIG. 19 or FIG. 31, and the destination(s) is determined. More specifically, when a destination is touched once, the destination is inverted for indication of selected state, and when the destination is touched again, the inverted state is cancelled for indication of unselected state. Accordingly, the user can select one or more desired destinations.

When the selection of destination has been performed, the selected destination(s) is displayed on a space below the "destination" in FIG. 14, and the user can check the destination(s) selected by the user himself/herself.

In the present embodiment, as the transmission destinations, destinations of different categories can be selected. For example, regarding one read original image, a file server is selected as a transmission destination, and further, another destination can be selected as a destination of mail transmission. Further, other transmission categories, "facsimile", "printer", "FTP" and "group" can be mixedly selected.

As described above, various settings such as reading mode can be made in accordance with necessity, and the selection of transmission destination is performed. This processing is performed in the scanner control PC 500 on the network 300, more particularly, performed in the loop processing in steps S52, S53 and S55 in FIG. 9.

In a case where the scanning application operating on the scanner control PC 500 detects that the destination is displayed in the destination list field in FIG. 14 and a "scan" button is touched, the scanning application issues notification of the content of setting and a reading command to the scanner driver. If the content of setting indicates execution of scanning on the scanner 200 side, the scanner driver outputs the set command with a scan start command to the virtual SCSI driver 553, while if the content of setting indicates execution of scanning by the scanner driver itself, the scanner driver outputs the scan start command to the virtual SCSI driver 553. The virtual SCSI driver 553 transmits the command (including a SCSI-ID of the scanner 200) from the scanner driver as higher-layer processing toward the port P3 of the scanner/network connection apparatus 100 via the network 300 (this operation corresponds to step S56 in FIG. 9).

The SCSI server 153 in the scanner/network connection apparatus 100 receives the command, and executes the command for the SCSI interface 108, thereby causes the scanner 200 to perform original reading. As a result, the SCSI server 153 receives data obtained by image reading via the SCSI interface 108, and transmits the data toward the port P3 of the scanner control PC 500, i.e., the virtual SCSI driver 553. The virtual SCSI driver 553 transmits the received image data to the scanner driver. The scanner driver performs appropriate processing on the image data (in some cases, the data is passed through the scanner driver without any processing) and forwards the image data to the scanning application. The scanning application receives the image data and stores the data in a temporary storage area of the HDD 509 (this operation corresponds to step S57 in FIG. 9).

Thereafter, the scanning application performs transmission of the stored image in accordance with the contents of settings made in the loop processing at steps S52, S53 and S55 (this operation corresponds to step S58 in FIG. 9).

Figure 39:
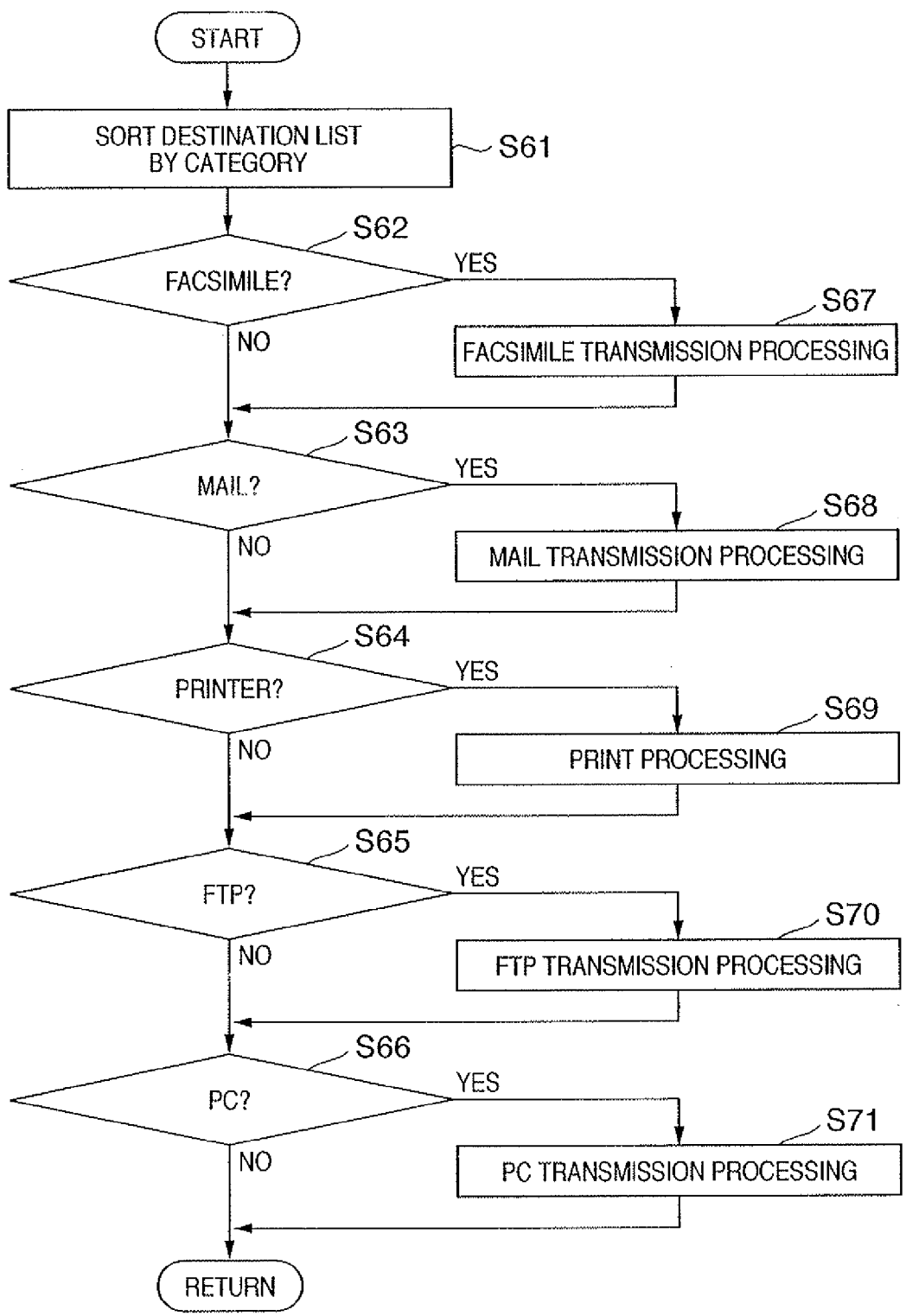
FIG. 39 is a flowchart showing the details of step S58 in FIG. 9.

Hereinbelow, the content of particular processing at step S58 in FIG. 9 will be described with reference to the flowchart of FIG. 39.

First, at step S61, the destination information selected in the loop processing at steps S52, S53 and S55 in FIG. 9 is sorted by transmission category. For example, for facsimile transmission, destinations of facsimile transmission are grouped. Next, at steps S62 to S66, it is determined whether or not there is a destination of facsimile transmission, mail transmission, transmission to a printer (printing), FTP transmission and transmission to a PC (storage into a file server), and if a destination exists in the respective transmission categories, transmission processing is performed at steps S67 to S71.

For example, upon facsimile transmission (step S67), the image data is transmitted with the destination information (telephone number) to a facsimile server (See FIG. 1). The facsimile server facsimile-transmits the received image data to the designated destination. Note that if plural destinations exist in facsimile transmission, the image data is transmitted to the facsimile server for the respective destinations. If the facsimile server has a broadcast transmission function, it is not necessary to transmit the image data plural times to the server.

Further, in a case where a facsimile modem is connected to the scanner control PC 500 itself, a facsimile service using the facsimile modem is started, and the image data is forwarded to the service. In this case, the facsimile server is not necessarily provided independently of the scanner control PC 500.

Upon mail transmission, the image data is converted to MIME (Multipurpose Internet Mail Extensions) format data and sent with the destination mail address to a mail server. Further, a subject and text, if exist, are also transmitted with the image data. Note that as a communication protocol from the scanner control PC 500 to the mail server, SMTP or the like may be employed. The mail server performs transmission via a router or the like in accordance with a well-known procedure.

Further, upon print processing, the image data is outputted to a network printer. Note that as it is well known, the output is performed via a printer driver (a driver for the network printer designated by the user) in the scanner control PC 500.

Upon FTP transmission, the image data is transmitted to a designated FTP server in accordance with the FTP protocol. Further, if the transmission destination is a PC (file server), the image data is transmitted to a shared name of the file server. Note that if the transmission destination is a FTP server, a mail server, a PC or the like, the designated file name is set, and the data is converted to the designated file format (PDF or the like) prior to the transmission.

As described above, transmission of image data, obtained by reading an original image, to plural destinations of even mixed transmission categories, can be realized by using the image data obtained by the one-time-only original reading. That is, even if plural transmission destinations exist and further, even if different transmission categories are mixed, the scanner control PC 500 performs arrangement of the destinations for different transmission categories. As a result, the scanner 200 performs original reading once.

As described above, according to the present embodiment, the scanner/network connection apparatus 100 as hardware, and the virtual driver group and the scanning application which operate on a general PC, enable use of an existing general SCSI scanner on a network. Further, as the construction of the scanner/network connection apparatus 100 is very simple, the network scanning system can be constructed at a low cost.

Further, as described above, as the firmware which operates on the scanner/network connection apparatus 100 has a minimum number of functions, it is substantially unnecessary to update the firmware (in a case where the firmware is updated, as a storage may be a mask ROM in place of a rewritable flash memory or the like, a further low-cost apparatus can be provided).

Further, as the destination of transmission of image data obtained by original reading is not limited to a file server, but destinations in mail transmission and facsimile transmission, transmission to a printer and the like can be designated. Accordingly, the procedure of temporary storage in a file server and operation using a PC in the conventional art can be omitted.

Further, as the setting for reading can be made and/or changed on the scanner/network connection apparatus 100, the user can provide an instruction of original image reading and set the reading conditions as a series of operations. Thus an excellent user interface can be provided.

Further, according to the present embodiment, transmission of an original image can be performed by different categories of transmission, e.g., facsimile transmission and mail transmission. This further improves the user's convenience.

[Second Embodiment]

In the above embodiment, when an original image is read by the scanner 200 and the scanner/network connection apparatus 100 transmits the image data to the scanner control PC 500, the CPU 501 of the scanner control PC 500 expends much CPU power in image data reception and storage processing.

This means that during original image reading, it is difficult to update a display image on the scanner/network connection apparatus 100 from the scanner control PC 500, and if the update is performed, the speed of image data transmission may be lowered. Accordingly, to place a high priority on the image data transmission speed, the display image on the LCD 106 of the scanner/network connection apparatus 100 cannot be changed. However, to the user of the scanner/network connection apparatus 100, during transmission of original image data, the screen image of the LCD 106 is frozen, and the user may feel anxious about the processing.

Accordingly, in the second embodiment, the scanner/network connection apparatus 100 is provided with an animation function of autonomously changing plural display images.

The images to be displayed are previously outputted from the scanning application of the scanner control PC 500 to the scanner/network connection apparatus 100 and stored there, and the scanner control PC 500 transmits commands to control the start and end of animation to the apparatus.

Further, the timing of issuance of the animation start command by the scanning application in the scanner control PC 500 is immediately before the issuance of the scan start command.

To realize the above processing, processing as follows is performed in the scanner/network connection apparatus 100.

Figure 40:
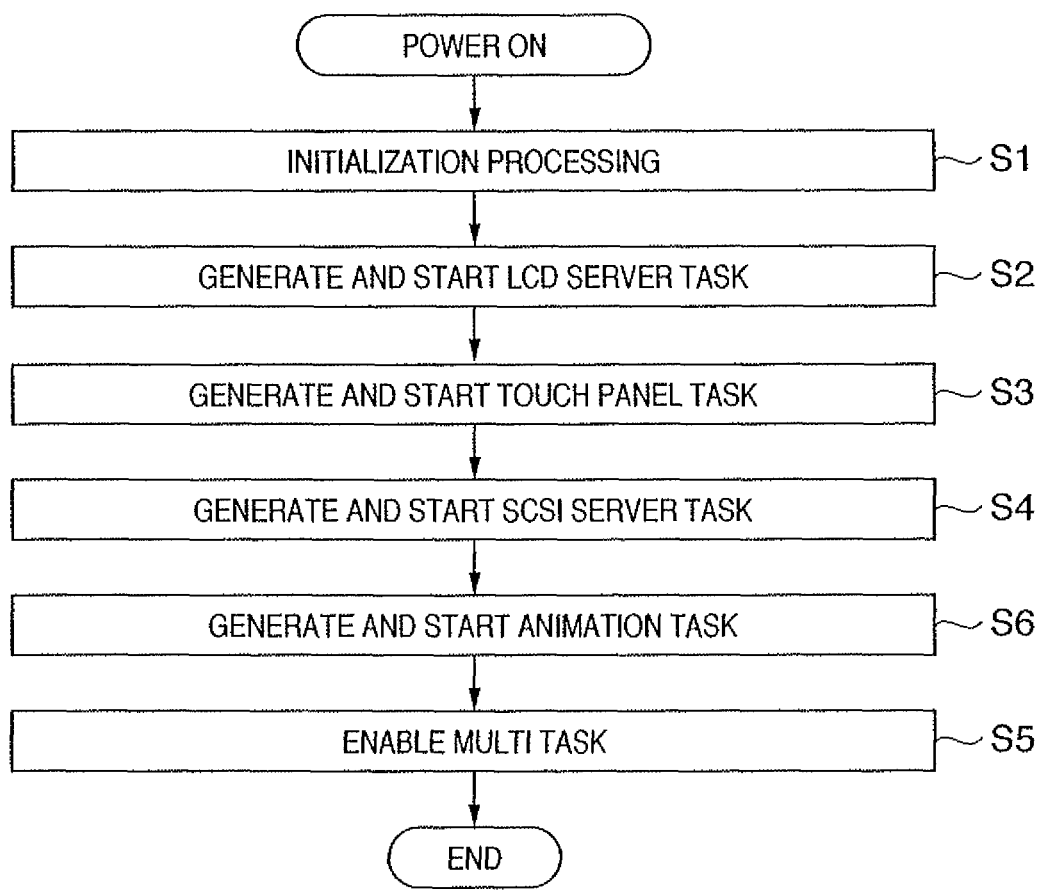
FIG. 40 is a flowchart showing a processing procedure upon power-up of the scanner/network connection apparatus according to a second embodiment of the present invention.

FIG. 40 is a flowchart showing a processing procedure upon power-up of the scanner/network connection apparatus 100 according to the present embodiment. The flowchart of FIG. 40 is the same as that of FIG. 4 except that step S6 for processing related to generation and start of animation task is added between steps S4 and S5 and that processing to turn an animation flag (a flag ensured on the RAM 503 to determine enabled/disabled state of animation) OFF is added to the initialization processing at step S1.

For example, the animation task is as described in FIG. 41.

First, at step S71, it is determined whether or not the animation flag is ON, and no processing is performed unless the flag is ON.

Further, if it is determined that the animation flag is ON, the process proceeds to step S72, at which a timer value (not shown) is obtained. At step S73, it is determined whether or not it has been a predetermined or longer period of time since a previous image was displayed. If it is determined that the predetermined or longer period has elapsed, the next image data is read from the RAM 103, and the LCD controller is controlled to display the next image.

Figure 42:
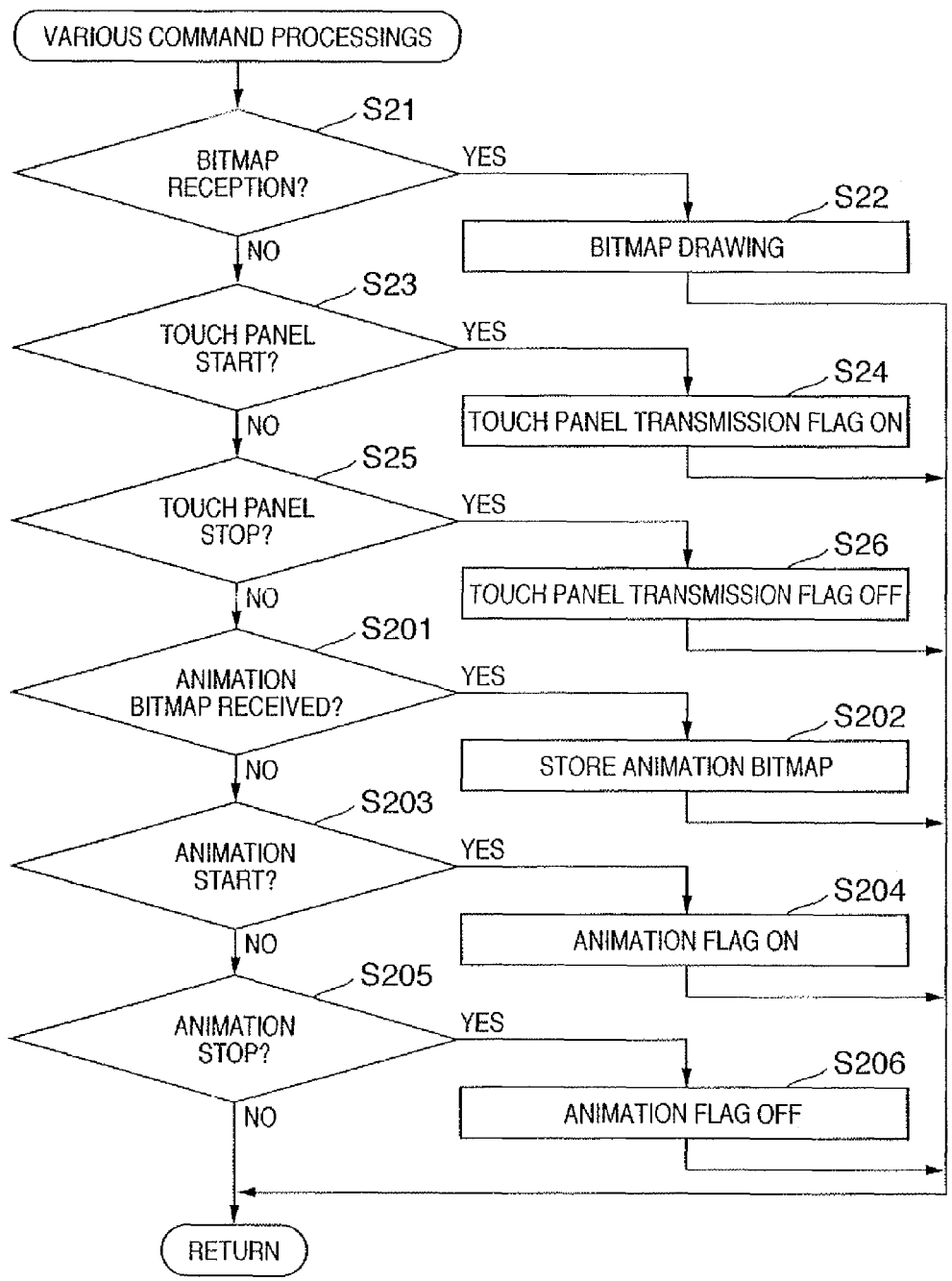
FIG. 42 is a flowchart showing a processing procedure by the LCD server according to the second embodiment.

FIG. 42 is a flowchart showing a processing procedure by the LCD server 151 according to the second embodiment.

In FIG. 42, the difference from FIG. 6 is that steps 5201 to S206 are added. That is, processing of storing the animation bitmap data, when received, into the RAM 103 and processing of turning the animation flag ON/OFF in correspondence with the animation start/end command are provided.

On the other hand, regarding the scanning application in the scanner control PC 500, it may be arranged such that immediately before step S56 in FIG. 9, in response to the user's selection of the scan start button, the scanning application transmits a command indicating animation and (at least two) bitmap images to the scanner/network connection apparatus 100 and stores them in the apparatus, and transmits the animation start command, and when the image input has been completed at step S57, the scanning application transmits the animation stop command.

Figure 45:
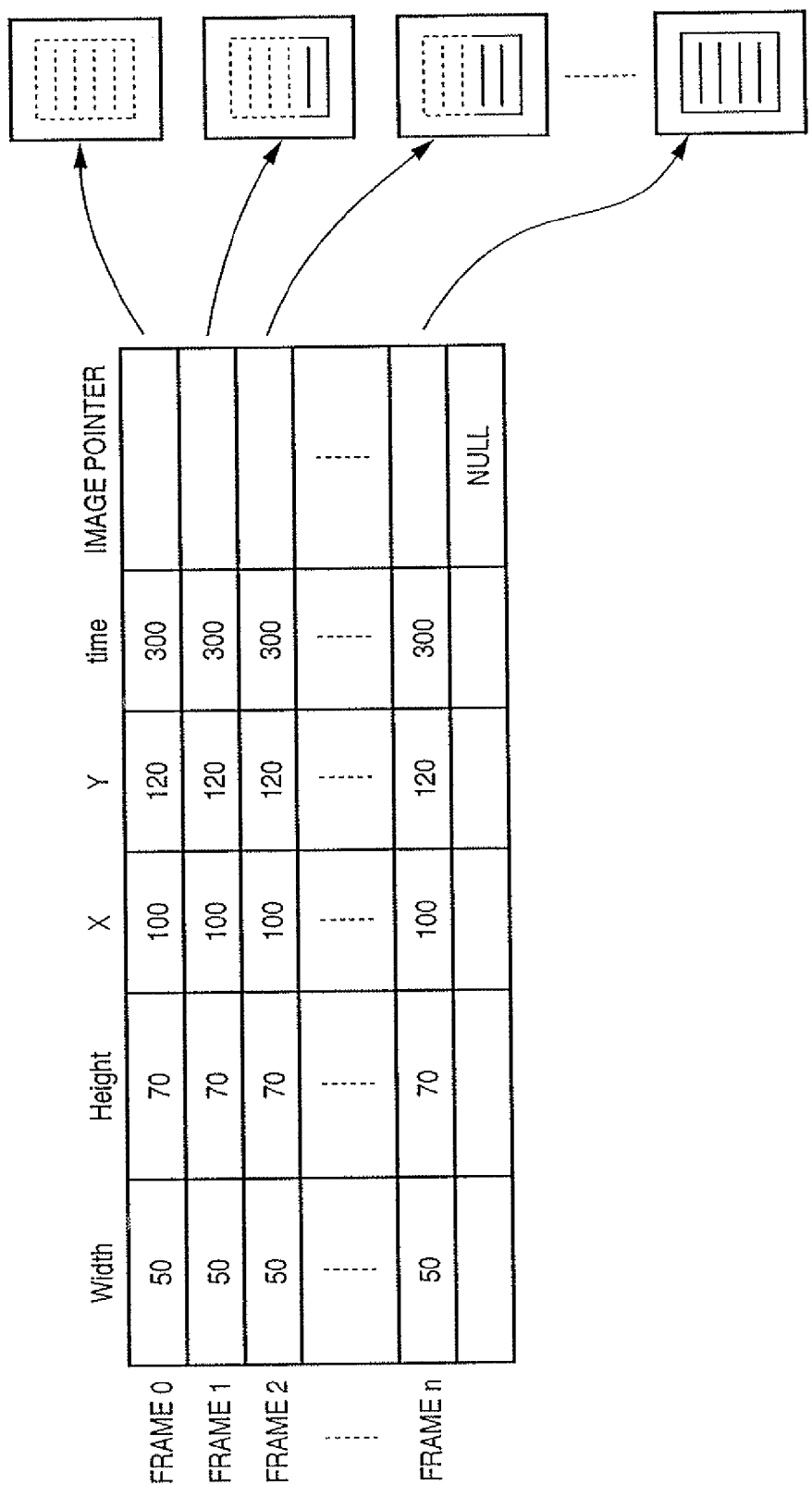
FIG. 45 is an example of a table generated in the animation processing.

FIG. 45 is an example of a table for management of the animation images stored in the RAM 103. As shown in FIG. 45, in the table, the bitmap images are managed with storage pointers (addresses) on the RAM 103, and display time of the respective frames (if a display interval is uniformly the same, this field is unnecessary). As a record subsequent to the last record, NULL data indicating that no more frames exist is stored. Actually, in the case of simple animation, about 2 to 5 frames are prepared, however, elaborate animation can be made. Further, the bitmap images are not necessarily stored in the screen image size. Only a portion where animation is run (in illustration, a bitmap image with xy coordinates of 100, 120, and width of 50 and height of 70) is stored, thereby the storage size can be reduced.

Figure 43:
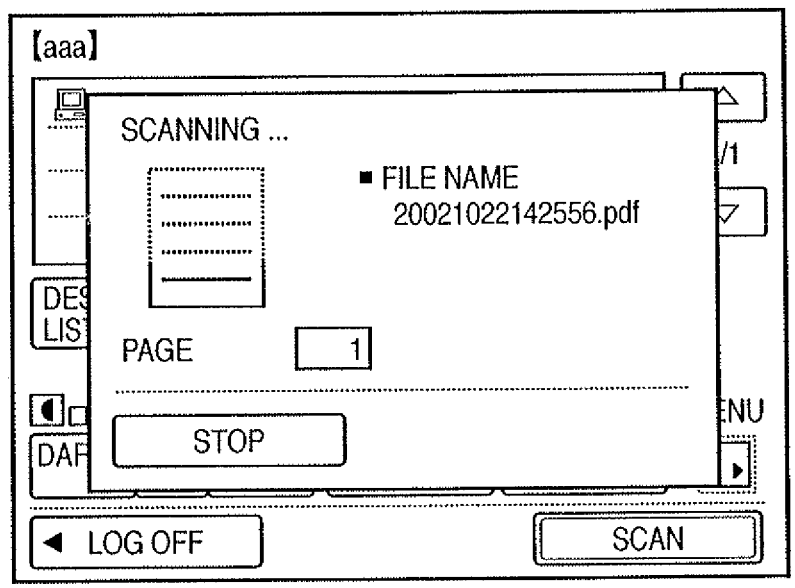
FIGS. 43 and 44 are examples of a screen image in course of original reading by the animation processing according to the second embodiment.
Figure 44:
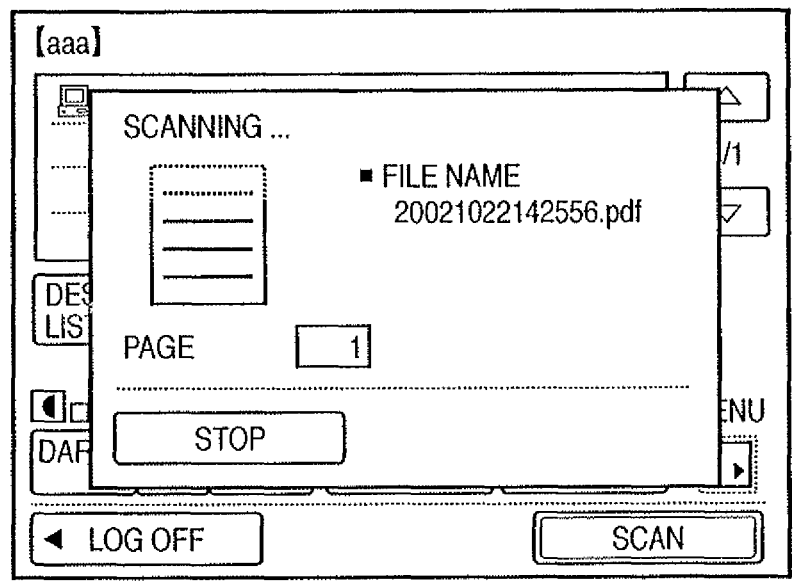

By this processing, during transmission of image data obtained by original reading to the scanner control PC 500, images as shown in FIGS. 43 and 44 are alternately displayed. The animation informs the user of the progress of processing.

Note that in the present embodiment, 2 images are alternately displayed, however the number of images is not limited to 2 but may be 3 or more. Further; in the present embodiment, the animation processing is handled equally with the tasks such as the LCD server, however, as the image change interval in the animation processing is merely about 2 images/1 second, the priority of the animation processing in the multi task processing can be lowered. In some cases, it may be arranged such that the animation processing is performed by interruption by 0.5 seconds.

Further, in a case where the scanner 200 is provided with an ADF and plural originals can be read at once, the application transfers only an image indicating a page number each time one original is read, thereby the page currently being read is notified.

Further, a modification of the second embodiment is as follows. When the scanning application has not received touch position information from the scanner/network connection apparatus 100 after a lapse of predetermined period, image information displayed at that time is saved, and animation bitmap data and the animation start command are transmitted. Thereafter, when touch coordinate data is received, the animation stop command is transmitted and the saved image is transmitted. In this manner, when the user does not operate the apparatus, entertaining animation can be presented.

Note that in the embodiments, the scanner connected to the scanner/network connection apparatus 100 has the SCSI interface, however, the scanner may have a USB (Universal Serial Bus) interface or any other interface. For example, in the case of a USB scanner, a virtual USB driver is installed in the scanner control PC 500, and the scanner/network connection apparatus 100 is provided with a USB server in place of the SCSI server. It can be easily conceived by a person skilled in the art that similar advantages can be obtained in this case.

Further, the user interface of the scanner/network connection apparatus 100 is not limited to the LCD (liquid crystal display)+the touch panel, but any other interface may be employed. In such case, drivers and firmware corresponding to the interface may be prepared. Note that it is not desirable to provide the scanner/network connection apparatus 100 with physical switches and buttons, since marks and characters of the physical switches and buttons constrain the functions of the apparatus. Accordingly, as in the case of the above embodiments, from the viewpoint of user interface, logical (graphical) buttons and the like displayed on a display screen are preferable.

Further, in the embodiments, the purposes of original image reading are facsimile transmission, mail transmission, transmission to a printer (printing), FTP transmission and storage into a PC, however, the present invention is not limited to these purposes. For example, it may be arranged such that OCR processing is performed, and the result of processing is transmitted to a desired destination, otherwise, stored in a filing system.

Further, a general application which performs original image reading from a scanner and performs various image editing processings does not use the virtual LCD driver and the virtual touch panel driver as described in the embodiments, however, the general application can use at least the virtual SCSI driver in the embodiments. That is, it is conceivable that if the virtual SCSI driver is installed, the existing application operates the virtual SCSI driver.

Further, in the embodiments, the scanner/network connection apparatus 100 as hardware is necessary, however, its control application (the scanning application) and the virtual drivers are realized by installing programs in a general information processing apparatus such as a personal computer. Accordingly, it is apparent that the present invention includes these computer programs.

Further, generally, a computer program (an application or a driver) is stored in a computer-readable storage medium such as a CD-ROM and installed in a computer when the medium is set in the computer. Accordingly, it is apparent that the present invention includes such computer-readable storage medium within its scope.

As described above, according to the present invention, an image scanner device connected to a general information processing apparatus can be utilized on a network at a low cost, and further, firmware of hardware for this purpose can be used as maintenance-free firmware. Thus user's convenience can be improved.

Further, according to the present invention, an image scanner device connected to a general information processing apparatus can be utilized on a network at a low cost, and further, an existing application using the image scanner can use the remote scanner without any substantial change.

The present invention is not limited to the above embodiments and various changes and, modifications can be made within the spirit and scope of the present invention. Therefore, to appraise the public of the scope of the present invention, the following claims are made.

What is claimed is:

1. A network scanning system comprising:
an image scanning device;
a connection device which includes a display unit and connects with the image scanning device; and
a control apparatus which is connected to the connection device via a network and includes a scanning application for controlling the image scanning device remotely via the network,
wherein the scanning application in the control apparatus receives a command from the connection device and in response to receiving the command, automatically transmits, to the display unit of the connection device via the network without a user operation of the scanning application in the control apparatus, a selection screen information including items, each of which represent a kind of processing for an image of a document to be scanned by the image scanning device connected to the connection device,
wherein the connection device displays, on the display unit, a selection menu based on the selection screen information received from the scanning application in the control apparatus via the network, and the connection device transmits, to the scanning application in the control apparatus via the network, a selection item information specifying an item, selected by an operation of a user of the display unit, among the items in the selection menu displayed on the display unit, and
wherein the scanning application in the control apparatus, in response to receiving the selection item information from the connection device, automatically transmits, to the connection device without a user operation of the scanning application in the control apparatus, a control signal based on the selection item information received from the connection device via the network, and the scanning application in the control apparatus automatically controls the image scanning device remotely in accordance with the control signal via the network.

2. The network scanning system according to claim 1, wherein the connection device transmits, to the control apparatus, the image obtained from the image scanning device that scans a document.

3. The network scanning system according to claim 2, wherein the selection screen information includes a plurality of transmission destinations as the items in the selection menu, and
wherein the control apparatus transmits the image received from the connection device to a transmission destination or any transmission destinations, designated by the user, among the plurality of transmission destinations displayed on the display unit.

4. The network scanning system according to claim 2, wherein the selection screen information includes a plurality of destinations having different transmission categories as the items in the selection menu, and
wherein the control apparatus transmits the image received from the connection device to a transmission destination or any transmission destinations, designated by the user, among the plurality of transmission destinations displayed on the display unit.

5. The network scanning system according to claim 1, wherein the selection screen information includes a plurality of scanning modes for scanning a document as the items in the selection menu.

6. The system according to claim 1, wherein the connection device includes a touch-sensitive panel on the display unit and transmits position information indicating a position, on the touch-sensitive panel, touched by a user as the selection screen information to the scanning application in the control apparatus via the network, and
wherein the scanning application in the control apparatus determines a processing to be executed based on the position represented by the selection screen information and positions representing items included in the selection screen information.

7. A method executed in a network scanning system comprising an image scanning device, a connection device which includes a display unit and connects with the image scanning device, and a control apparatus which is connected to the connection device via a network and includes a scanning application for controlling the image scanning device remotely via the network, the method comprising:
the scanning application in the control apparatus receiving a command from the connection device and in response to receiving the command, automatically transmitting, to the display unit of the connection device via the network without a user operation of the scanning application in the control apparatus, a selection screen information including items, each of which represent a kind of processing for an image of a document to be scanned by the image scanning device connected with the connection device;

the connection device displaying, on the display unit, a selection menu based on the selection screen information received from the scanning application in the control apparatus via the network, and the connection device transmitting, to the scanning application in the control apparatus via the network, a selection item information specifying an item, selected by an operation of a user of the display unit, among the items in the selection menu displayed on the display unit; and the scanning application in the control apparatus, in response to receiving the selection item information from the image scanning system, automatically transmitting, to the connection device without a user operation of the scanning application in the control apparatus, a control signal based on the selection item information received from the image scanning device via the network, and the scanning application in the control apparatus automatically controlling the connection device remotely in accordance with the control signal via the network.

8. A non-transitory computer-readable storage medium which stores code of a program that, when executed, implements a control method in a network scanning system comprising an image scanning device, a connection device which includes a display unit and connects with an image scanning device, and a control apparatus which is connected to the connection device via a network and includes a scanning application for controlling the image scanning device remotely via the network, the method comprising:

the scanning application in the control apparatus receiving a command from the connection device and in response to receiving the command, automatically transmitting, to the display unit of the connection device via the network without a user operation of the scanning application in the control apparatus, a selection screen information including items, each of which represent a kind of processing for an image of a document to be scanned by the image scanning device connected with the connection device;

the connection device displaying, on the display unit, a selection menu based on the selection screen information received from the scanning application in the control apparatus via the network, and the connection device transmitting, to the scanning application in the control apparatus via the network, a selection item information specifying an item, selected by an operation of a user of the display unit, among the items in the selection menu displayed on the display unit; and the scanning application in the control apparatus, in response to receiving the selection item information from the image scanning system, automatically transmitting, to the connection device without a user operation of the scanning application in the control apparatus, a control signal based on the selection item information received from the connection device via the network, and the scanning application in the control apparatus automatically controlling the image scanning device remotely in accordance with the control signal via the network.

* * * * *